United States Patent [19]

Richman

[11] 4,245,239

[45] Jan. 13, 1981

[54] COLOR TELEVISION RECEIVING SYSTEM UTILIZING INFERRED HIGH FREQUENCY SIGNAL COMPONENTS TO REDUCE COLOR INFIDELITIES IN REGIONS OF HIGH COLOR SATURATION

[75] Inventor: Donald Richman, Huntington, N.Y.

[73] Assignee: Quadricolor Technology L.P., Great Neck, N.Y.

[21] Appl. No.: 812,229

[22] Filed: Jul. 1, 1977

[51] Int. Cl.$^2$ .................. H04N 5/14; H04N 5/21
[52] U.S. Cl. ..................................... 358/37; 358/36
[58] Field of Search .............................. 358/36, 37

[56] References Cited

U.S. PATENT DOCUMENTS

| | | | |
|---|---|---|---|
| 2,905,753 | 9/1959 | Loughlin | 358/36 X |
| 3,778,543 | 12/1973 | Lowry | 358/36 X |
| 3,836,707 | 9/1974 | Marakami et al. | 358/36 X |
| 3,984,865 | 10/1976 | Aoins | 358/36 |

*Primary Examiner*—Robert L. Griffin
*Assistant Examiner*—Aristotelis M. Psitos
*Attorney, Agent, or Firm*—Pennie & Edmonds

[57] ABSTRACT

A color television receiving system for NTSC-type signals is provided with signal processing circuitry and methods for reducing the visibility of color infidelities, such as over-modulation, rectification, desaturation, and inadequate highs, which are visible in regions of high color saturation. Such infidelities are substantially reduced by effectively supplementing either the chrominance or the primary color signals with inferred high frequency chrominance components derived from signal information discovered to be inherently available in NTSC-type signals and their implicit constraints. Specifically, it has been found that in regions of high color saturation, high frequency chrominance components can be scaled from the high frequency portion of the received monochrome signal in accordance with the respective ratios of the value of the received reduced bandwidth chrominance signal to the value of a comparable low frequency component of the received monochrome signal. Alternatively, inferred high frequency primary color components can be analogously derived. A variety of specific circuit embodiments and methods can be used to derive suitable inferred high frequency components.

212 Claims, 36 Drawing Figures

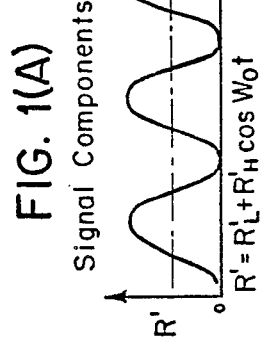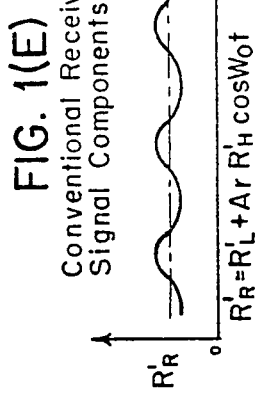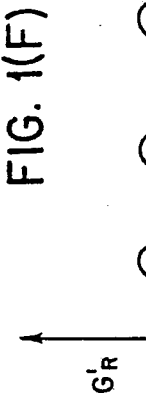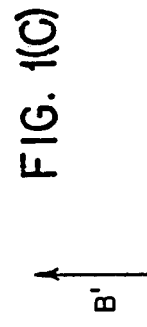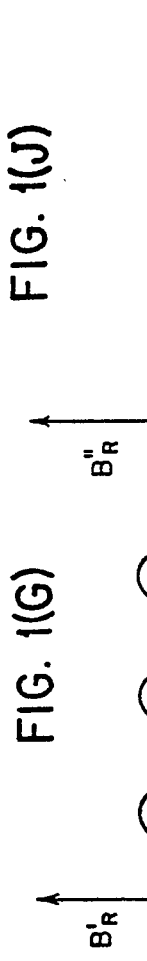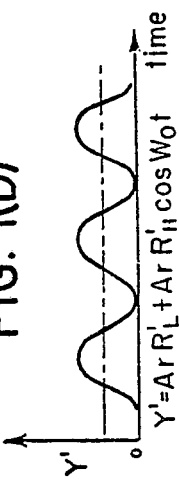

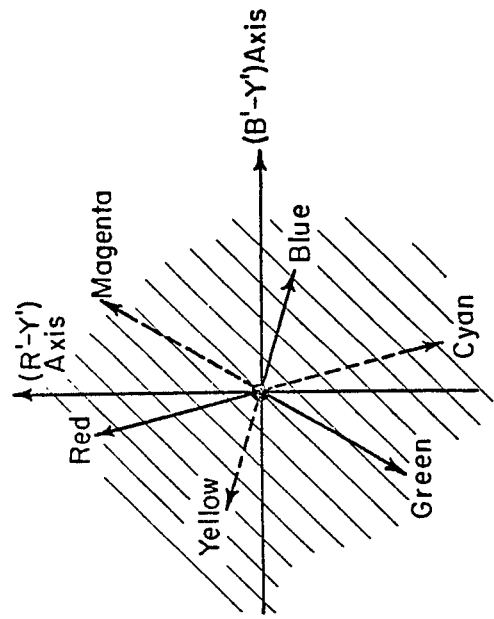

FIG. 3

Regions — All Parametric Versions
--- Pure Complemerary, All Versions
///— Modulated Colors, Central Parametric Algorithm Nearby Regions, Wide Range of Parameters Chrominance Plane, Showing Regions in Which Inferred De-Mixed Independent Highs Receiving System Are Generally in Correct Proportion in Each Primary Color.

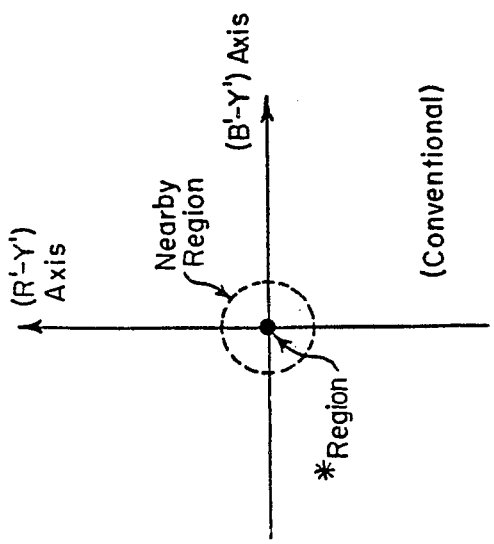

FIG. 2
Illustrative Chrominance Plane Coverage (Conventional)

Chrominance Plane, Showing Region * in Conventional Mixed Highs Receiving System Where Highs and Lows Are in Correct Proportion in Each Primary Color.

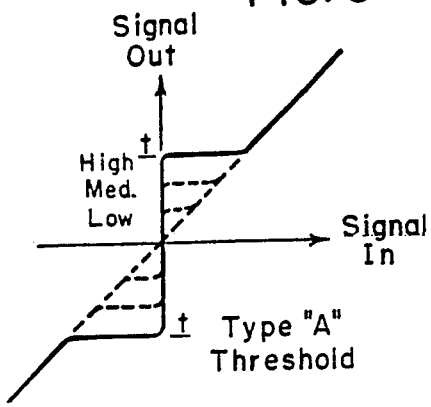
FIG. 5
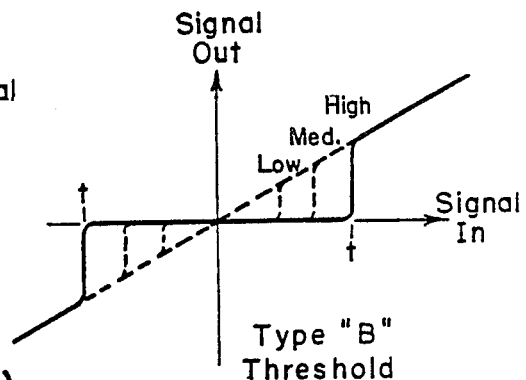
FIG. 6
FIG. 7(A)
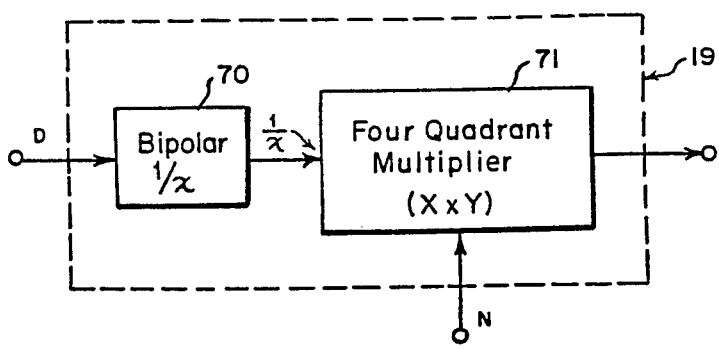
FIG. 7(C)
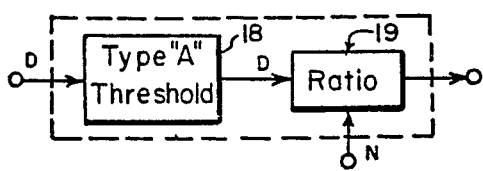
FIG. 7(B)
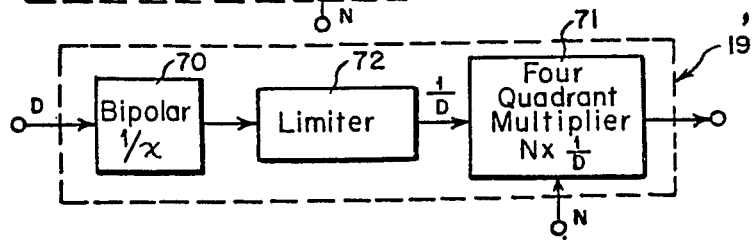

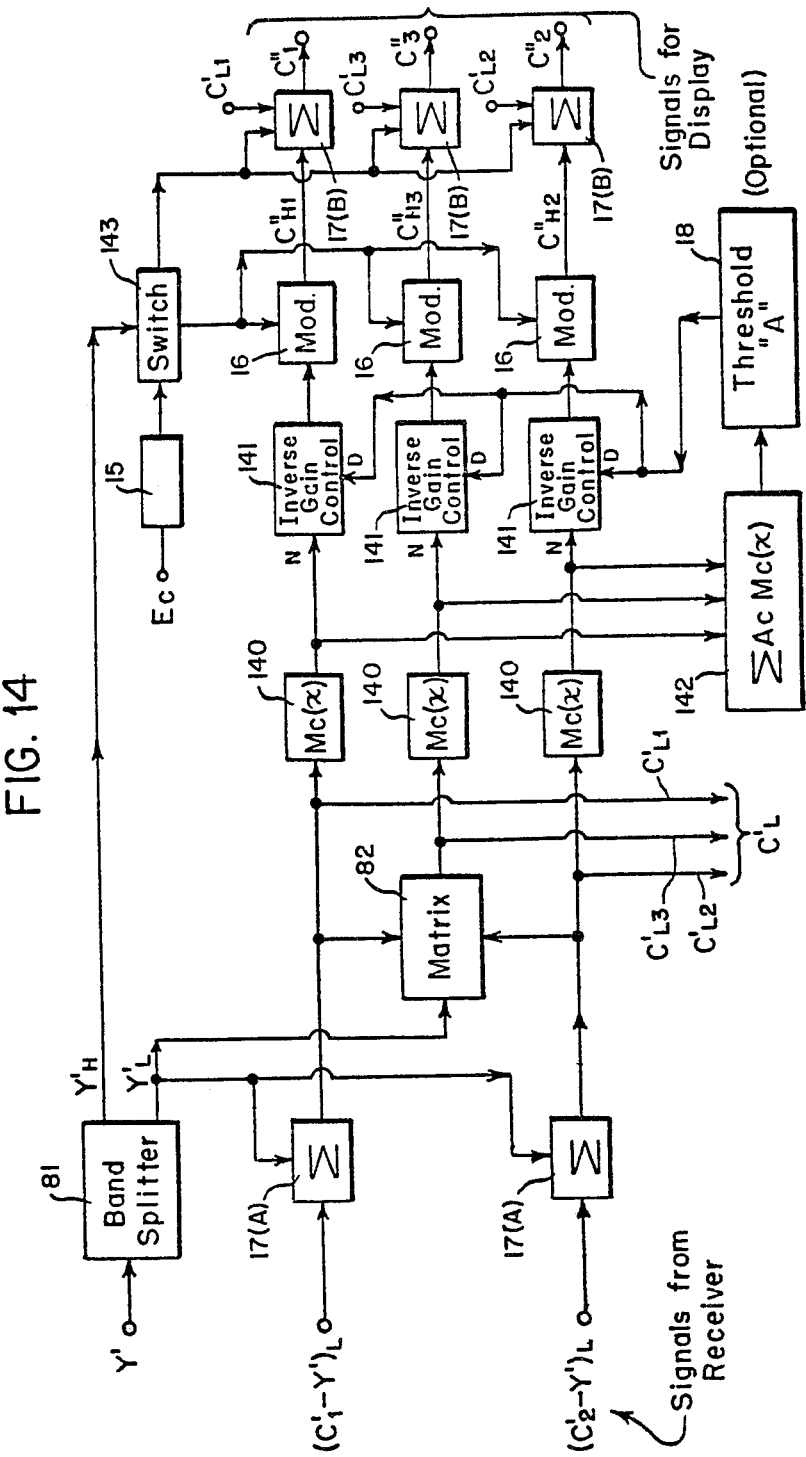

COLOR TELEVISION RECEIVING SYSTEM UTILIZING INFERRED HIGH FREQUENCY SIGNAL COMPONENTS TO REDUCE COLOR INFIDELITIES IN REGIONS OF HIGH COLOR SATURATION

BACKGROUND OF THE INVENTION

Color television transmission systems used throughout the world are based on or derived from signal specifications originally defined in the United States by the National Television Systems Committee (NTSC). Such systems, which will be referred to herein as NTSC-type systems, include the NTSC format system used in the United States and the well-known PAL and SECAM systems used abroad. These systems utilize composite color television signals comprising a wide band monochrome signal and a plurality of chrominance signals.

The wideband monochrome signal, generally represented by the term Y', is typically a combination of three primary color signals, e.g., red, blue, and green, which have been precorrected for the power law gamma characteristic of typical display tubes. The presence of pre-correction in the constituents of a signal is conventionally indicated by designating the signal with a prime ('). The monochrome signal is typically of the form $Y'=\Sigma A_c C'=A_rR'+A_gG'+A_bB'$, wherein C' represents any gamma-corrected primary color signal, $A_c$, $A_r$, $A_g$ and $A_b$ represent respective nominal relative luminance coefficients for primaries, and R', G', and B' represent the gamma-corrected color signals for primaries red, green, and blue, respectively. The monochrome signal Y', as defined herein, should not be confused with the colorimetric luminance Y which is a corresponding combination of the uncorrected primary signals, nor should it be considered equal to a gamma-corrected luminance signal because in the monochrome signal it is the individual primaries which have been corrected, not the entire combination, i.e., $Y'=\Sigma A_c C'$ is not uniquely related to $Y=\Sigma A_c C$ for typical gamma correction exponents.

The chrominance signals in NTSC-type systems typically comprise signals representing the difference between a gamma-corrected primary color signal and the monochrome signal or a linear combination of such color difference signals. Specifically, color difference signals can be generally represented by the term $(C'-Y')_L$ wherein C' represents any gamma-corrected primary. The subscript L serves as a reminder that the chrominance signals are typically transmitted with a bandwidth which is relatively reduced as compared with the Y' signal and that it may be further bandwidth limited in the receiver.

Typical NTSC-type transmission systems are designed to transmit Y' in its full wide bandwidth and linear combinations of the chrominance signals in reduced bandwidth. In the United States, for example (R'−Y') and (G'−Y') are transmitted in linear combination signals designated the I' chrominance signal and the Q' chrominance signal. While the I' and Q' signals have somewhat different bandwidths, each substantially narrower than that of the Y' signals, the excess portion of the relatively wider bandwidth I' signal is often lost at the receivers, most of which are designed for equiband operation.

Conventional receivers use either equiband chrominance for all axes, or use in varying degrees the added intermediate bandwidth I' signal transmitted as a single-sideband component.

Some receivers use simplified approximations to the nominal I' passbands, while other receivers use wideband equiband systems. In order to shorten the chrominance transient epoch, these receivers accept erroneous chrominance components nominally from the single-sideband I' components, and they variously proportion these erroneous components between the I' and Q' channels.

This specification will present the equations and circuit means relative to the substantial chrominance improvements of this invention, first for processing of equal band signals and then also for processing of I' and Q' chrominance signals of unequal bandwidths.

Common NTSC-type receivers demodulate and matrix the received chrominance signals into a plurality of reduced bandwidth color difference signals $(C'-Y')_L$. The receiver then effectively adds the monochrome signal Y' to each chrominance signal in order to derive a plurality of signals which include, respectively, the low frequency components $C_L'$ of the primary color signals generated at the color camera and a combined high frequency component. The low frequency primary color components are sometimes referred to as the large area color signals. The high frequency component, $Y_H'$ is generally referred to as the mixed highs signal because it is transmitted and displayed only as a combination of the high frequency primary color components.

It has long been recognized that conventional NTSC-type receiving systems exhibit a number of visible color infidelities upon display, particularly in regions of high color saturation wherein one or more color primaries have low or zero values of local average color. When conventional NTSC-type receiver displays are compared against a reference display in which all of the primary color signals have a wide bandwidth comparable to that of Y', visible color infidelities, such as inadequate highs, overmodulation, rectification, and desaturation, can be observed in regions of high color saturation. These infidelities are clearly visible on modern displays as resolution and luminance errors, chromaticity smear, local desaturation, and spurious low frequency color components.

In regions of significant color saturation, a conventional color television display will typically exhibit: (1) a loss in detail due to inadequate high frequency components in the one or more strong primary colors and (2) over-modulation and rectification due to an excess of high frequency signal components in the one or more weak primary colors. The simplest example is that of a single saturated primary. In such case, the transmitted high frequency signal available for that primary solely from the high frequency signal Y' is too small, while the same Y' signal components are excessive in the other primary colors. More generally, similar infidelities generally occur and tend to be visible whenever the local color deviates significantly from white. Such infidelities are clearly visible on modern color television displays as resolution and luminance errors, chromaticity errors, and sometimes as spurious low frequency errors and local desaturation.

While there has been a widespread recognition that the conventional reception and display of NTSC-type signals produces the above-described color infidelities, none of the receiver correction circuits proposed in the prior art has provided satisfactory results. Typical prior art proposals for reducing saturation distortions have allocated the largest portion of the fault to the use of a Y' signal on transmission instead of a true luminance measure, such as a gamma-corrected Y signal. Accordingly, these proposals have included the proposal to change the transmitted signal from Y' to Y to the inverse-gamma power and various other proposals to otherwise precorrect the transmitted monochrome signal. All such proposals have gone unaccepted in the industry because (1) they typically failed to provide adequate color correction; (2) they typically degraded image quality in other respects; and (3) they were, in many cases, unduly complex.

The specific problem of inadequate highs has been treated, but the proposed solutions have deteriorated the image quality in other respects. For example, some prior art receivers utilize an enhanced gain in the common mixed-high region of the monochrome signal. This approach, however, cannot provide the differential relative amplitudes needed in the individual primary colors, and degrades the display image by producing increased rectification and desaturation. It has also been proposed to modulate the common mixed highs by the ratio of the square of an estimated gamma-corrected luminance to the square of Y'. This proposal, also, fails to provide differential relative amplitudes and it would introduce a major increase in rectification and desaturation as well as generate spurious high frequency signals.

SUMMARY OF THE INVENTION

In accordance with the present invention, a color television receiving system for NTSC-type signals is provided with signal processing circuitry and methods for reducing the visibility of color infidelities, such as over-modulation, rectification, desaturation, and inadequate highs, which are visible in regions of high color saturation. Such infidelities are substantially reduced by effectively supplementing the chrominance or primary color signals with inferred high frequency chrominance derived from signal information discovered to be inherently available in NTSC-type signals and their implicit constraints. Specifically, it has been found that in regions of high color saturation, high frequency chrominance components can be scaled from the high frequency portion of the received monochrome signal in accordance with the respective ratios of the value of the received narrow bandwidth chrominance signal to the value of a comparable low frequency component of the received monochrome signal. Alternatively, inferred high frequency primary color components can be analogously inferred. A variety of specific circuit embodiments and methods can be used to derive suitable inferred high frequency components.

UNDERLYING PRINCIPLES AND BASIC FEATURES OF THE INVENTION

A. The Principle of Inferentially De-Mixed Highs

Contrary to prior art thinking regarding the problem of correcting the above-described color infidelities, I have concluded that the use of the monochrome video signal Y' is fully acceptable and that these color infidelities are caused not by the form of the Y' signal but rather by the major reduction in the bandwidth of the chrominance signals at the transmitter and, by the further bandwidth reduction in conventional equiband receivers. I have discovered that, under certain conditions and subject to the application of certain techniques, inferred high frequency components can be derived from NTSC-type signals for supplementing the reduced bandwidth chrominance or low frequency primary color signals and thereby substantially reducing the visibility of these infidelities. Such inferred components can take the form of either inferred high frequency chrominance components or the resulting composite inferred high frequency color components. The addition of inferred chrominance to either the chrominance or the color channels, respectively, effectively "de-mixes" the highs.

This solution to the problem of correcting the subject color infidelities has the major advantage that it is able to utilize present transmitted signals with no requirements for change and may be readily incorporated into the design of conventional receivers. Accordingly, it is highly compatible with existing systems and apparatus.

It is a feature of the invention that for important portions of NTSC-type signals, it can provide inferred de-mixed high frequency components which maintain fidelity to the received video signal Y'; i.e., $\Sigma A_c C_H' = Y'$. This feature is significant because, of the transmitted signal components, only Y' provides a true representation of the full wideband primary color signals. This fact may be seen by reference to a non-linear color space defined by Y', $R' - Y'$ and $B' - Y'$ measured respectively along three orthogonal axes. In such a space, the primary color signals R', G', and B' each represent specific directions and each has a positive projection on the Y' axis. And because only Y' is transmitted with full bandwidth, it is the only transmitted component which provides a true measure of the primary color signals over the full wide bandwidth. Hence fidelity with the received Y' signal is a necessary condition for fidelity to the primaries R', G', and B' producible at the camera.

It is a further feature of the invention that for important portions of NTSC-type signals, it can provide inferred de-mixed highs which are of such magnitude as to render the color infidelities described above substantially less visible. Specifically, it can provide inferred de-mixed highs which substantially reduce the difference between (1) the R', G' and B' signals normally produced at the receiver and (2) the wideband R', G' and B' signals normally producible only at the color camera or transmitter.

It is a principal feature of this invention that the signal components deleted by the mixed highs signal composition and which may be further deleted in equiband signal processing by suppression of the single sideband I' component, need not remain deleted at the display. Provided proper and specific signal constraints, methods and circuit means are recognized and utilized, inferred high frequency chrominance components can be derived and differentially combined to effectively de-mix the highs so as to effectively reduce visible color infidelities specifically including those discussed above.

In a concept of this invention, the bandwidth limitations of NTSC-derived color systems result from the omission of the high frequency components on two chrominance axes, i.e., $(R' - Y')_H$ and $(B' - Y')_H$ or $I_H'$ and $Q_H'$, for example. In a conventional equiband receiver, only the low frequency color coordinates are translated for gamma correction and display. The receiver coordinates may be generally represented as $C_R' = (C' - Y')_L + Y_L' + Y_H' = C_L' + Y_H'$ whereas the originating transmitter color coordinates may be generally represented by $C_T'(C' - Y') + Y_L' + Y_H' = C_L' + C_H'$. It will be recognized that the signal information that is lost in the conventional transmission and equal or unequal bandwidth reception of NTSC-type signals is entirely in the high frequency chrominance. If the missing chrominance components $(C'-Y')_H$ could be largely restored at the receiver, the image deficiencies now observed on color receivers using conventional mixed highs signal processing would be substantially eliminated.

In accordance with a principal teaching of this invention, the missing high frequency components $(C'-Y')_H$ are inferred from available signal information in the receiver and circuit means are provided for generating inferred high frequency components designated $(C_H''-Y_H')$ which are used separately and independently for each primary, producing different highs as required for each color. Since the inferred highs are not the same in each color and since they remove the mixed highs nature of the television signals and displayed pictures, the resulting high frequency signal components are also here referred to as de-mixed highs.

B. The Method of Generation of Inferred De-Mixed Highs for Colored Regions

There are several signal conditions for which high frequency signal components that exist in the original gamma corrected primary color camera signals can be reliably inferred from the available bandwidth limited signal components in the receiver.

In a concurrently filed U.S. patent application Ser. No. 812,228 entitled "Color Television Receiving System Utilizing Inferred High Frequency Signal Components To Reduce Color Infidelities In Regions of Color Transitions," the present applicant discloses methods and signal processing circuitry for synthesizing inferred de-mixed high frequency signal components for reducing the visibility of color infidelities in regions of color transitions. In that application, separate inferred high frequency components are synthesized as inferred step high frequency chrominance components, $(C_H''-Y_H')$, of the form:

$$(C_H'' - Y_H') = Y_H' \left[ \frac{d/dt(C'-Y')_L}{d/dt(Y_L')} \right]$$

Or, alternatively and equivalently, they are synthesized as inferred step high frequency primary color components $C_H''$, of the form:

$$C_H'' = Y_H' \left[ \frac{d/dt(C_L')}{d/dt(Y_L')} \right]$$

This method of generation of inferred de-mixed highs in regions of color transitions relies and is dependent upon the fact that in such regions, the ratio of the missing chrominance highs to the available monochrome highs is substantially proportional to the ratio of the derivatives of the corresponding available low frequency components. This relationship may be considered a consequence of the fact throughout a step, transient chrominance signal vectors in an appropriately defined color space generally maintain their direction.

The present application, in contrast with said concurrently filed application, is concerned with methods of generation of inferred de-mixed highs in colored regions which are not necessarily transitional and wherein the relations among the three components are different from those in step transients. In this present case, the inferred high frequency components will be referred to as inferred dependent chrominance highs in order to distinguish them from the co-pending case involving inferred-step highs, and they have a different form.

The principal object of the present invention is to provide signal processing methods and circuits for generating from available signal components and their inherent constraints, inferred independent high frequency components which (1) are constructively representative of the missing high frequency chrominance signals and (2) can be differentially combined with received low frequency color components to reduce the visibility of the above-described color infidelities.

In a central and preferred form of this invention, the missing high frequency chrominance components $(C_H''-Y_H')$ are derived in accordance with the equation:

$$(C_H'' - Y_H') = Y_H' \left[ \frac{(C'-Y')_L}{Y_L'} \right] \equiv Y_H' N_I \quad \text{(Eq. 1)}$$
$$= \left[ \frac{Y_H'}{Y_L'} \right] [(C'-Y')_L]$$

which is algebraically equivalent to $$C_H'' = Y_H' \left[ \frac{C_L'}{Y_L'} \right] \equiv Y_H'(1 + N_I) \quad \text{(Eq. 2)}$$
$$= \left[ \frac{Y_H'}{Y_L'} \right] [C_L'],$$

and this latter equation also represents a basic form of the invention. Here $Y_H'$ and $Y_L'$ are the separated highs and lows of the received monochrome signal $Y'$ and $(C'-Y')_L$ is the standard linearly-matrixable chrominance signal of limited bandwidth which has been encoded at the transmitter and received and processed at the receiver. The signal $C_L'$ represents the low frequency component of any color. It is available from the sum of a chrominance component $(C'-Y')_L$ and a comparably spectrally filtered position portion $Y_L'$ of the received composite monochrome signal $Y'$.

The added signal components are effectively chrominance. This may take the form of a high frequency added chrominance signal directly added to color or chrominance as a $(C_H''-Y_H')$ signal, or a signal effectively added such as by the generation of $C_H''$ and its addition to signals $(C'-Y')_L+Y_L'$. Since $Y_L'=Y'-Y_H'$ this comprises a net addition of $(C_H''-Y_H')$. Alternatively the inferred chrominance highs may be added by any non-linear processing approximation which provides composite color signals substantially equal to those defined above.

It is a feature of this form of the invention that the frequency components of the inferred independent highs are scaled from the high frequency component $Y_H'$ of the monochrome signal and extend in bandwidth over the spectral region occupied by $Y_H'$. The proportioning factors in brackets represent a ratio of the value of the reduced bandwidth chrominance or comparable primary color signals, respectively, to the value of a portion $Y_L'$ of the monochrome signal which is preferably substantially comparable in bandwidth thereto. The bandwidth of the selected high frequency component $Y_H'$ is preferably substantially complementary to the bandwidth of the low frequency portion $Y_L'$ or has a bandwidth which occupies a substantial portion of a complementary band.

It is an additional feature of this form of the invention that the inferred independent high frequency components can maintain fidelity to the high frequency portion $Y_H'$ of the received monochrome video signal, i.e. that the condition $\Sigma A_c(C_H'' - Y_H')=0$, can be satisfied. In addition, as will be shown, use of these components can substantially prevent spurious rectification and desaturation, and hence produce color signals which can be compatible with both the low and high frequency components of Y'.

Specifically by comparison, conventional NTSC, PAL or SECAM receivers using mixed highs exhibit overmodulation and rectification of highs in highly saturated areas and therefore do not maintain fidelity to $Y_H'$ or $Y_L'$.

While a conventional prior art receiving system provides correct high frequency components for only the single point in the chrominance plane corresponding to white, it is an additional feature of the present invention that it provides inferred high frequency components which tend to be basically correct on at least six lines in the chrominance plane and which, for many important cases, can be substantially correct over the entire chrominance plane.

In practicing a preferred form of the invention, separate threshold constraints can be placed on a numerator portion of the inferred signal such as $(C'-Y')_L$ and on a denominator portion, such as $Y_L'$. The former threshold constraint functions to suppress corrections for regions of little color, and the latter threshold prevents division by very small denominator signals.

Specific signal processing for both equiband processing and unequal band I', Q' processing are taught in this specification.

EXAMPLE 1

Method of Processing Inferred Independent Highs for Equiband Receiving Systems

Typical equiband receivers may effectively directly detect chrominance components such as $(R'-Y')_L$ and $(B'-Y')_L$ in reduced bandwidth principally defined by the double sideband chrominance signals. Since the color difference signals are designed to be zero on white, the third component is derived by linear algebraic matrixing. For such receivers, inferred high frequency components can be derived by processing in accordance with equations (1) or (2) above. If the bandwidth of the double sideband chrominance signal components is designated $f_L$ and the bandwidth of the monochrome signal components is designated $f_w$, the inferred high frequency correction components will have a bandwidth of substantially up to $f_w - f_L$.

EXAMPLE 2

Method of Processing Inferred Independent Chrominance Highs for Unequal Band I', Q' Receiving Systems NTSC-type systems are configured to permit use of receivers with unequal I' and Q' chrominance signals. Such systems receive and process the full monochrome video signal Y' in bandwidth $f_w$, a reduced bandwidth I' chrominance signal in bandwidth $f_{LI}$ and a reduced bandwidth Q' chrominance signal in bandwidth $f_{LQ}$. In application of the present invention, inferred independent chrominance highs can be processed for such receiving systems either for supplementing the I', Q' chrominance signals or for correcting the subsequently processed primary color signals.

For supplementing the chrominance signals, inferred independent high frequency components $I_H''$ and $Q_H''$ can be processed in accordance with the following relationships which are similar in form to Equation (1):

$$I_H'' = Y_{HI}'\left[\frac{I_L'}{Y_{LI}'}\right] \qquad \text{(Eq. 3a)}$$

$$Q_H'' = Y_{HQ}'\left[\frac{Q_L'}{Y_{LQ}'}\right] \qquad \text{(Eq. 3b)}$$

Here $Y'_{LI}$ represents the Y' component of bandwidth comparable to that of $I_L'$, i.e., $f_{LI}$, and $Y_{HI}'$ represents the complementary high frequency component of bandwidth $f_w - f_{LI}$. Similarly, $Y_{LQ}'$ represents the Y' component of bandwidth $f_{LQ}$ comparable to $Q_L'$ and $Y_{HQ}'$ represents the complementary portion having a bandwidth of $f_w - f_{LQ}$. The thus derived inferred high frequency components $I_H''$ and $Q_H''$ are then effectively combined with I' and Q' lows. They can be separately matrixed to give inferred high frequency components of the form $(C_H'' - Y_H')$, or jointly matrixed with the lows.

Alternatively, inferred independent highs can be processed for correcting the primary color signals. Because any chrominance signal of the form $C_H'' - Y_H'$ is a linear combination of the I' and Q' signals, proportionality constants $x_c$ and $y_c$ exist, such that in form:

$$C''-Y'=x_cI'+y_cQ' \qquad \text{Eq. 4}$$

It is a feature of this form of the invention that the inferred high frequency components can maintain fidelity to the high frequency portion $Y_h'$ of the received monochrome video signal. In addition they can be compatible with low frequency components of Y', and concurrently both.

In processing in accordance with each of the equations presented above, the inferred chrominance highs $(C_H'' - Y_H')$ are effectively added to the received mixed highs $Y_H'$ to produce the de-mixed highs $C_H''$. The denominator terms should be constrained to selectable minimum magnitudes; and the numerator terms must be concurrently present in order for the correction to take place.

C. Primary Constraints On The Inferred Highs

In the present case of inferred independent highs there is no fully defined deterministic waveform-shape relationship between the components $Y_L'$ and $Y_H'$. This is why they are referred to as independent.

It is a feature of this invention that specific new and useful signal processing constraints have been recognized and taught which permit generation of inferred chrominance highs which are capable of significant reduction of deficiencies currently displayed with conventional receiving systems.

Primary ones of these constraints are as follows:

(i) Constraint No. 1

At intervals where there is local low frequency, nonzero signal value in but a single primary color with no such lows on the other primary colors, then there should be no high frequency chrominance components in the absent colors at those intervals. This constraint is automatically satisfied by processing in accordance with Equations (1) through (4), above and certain approximations thereof.

(ii) Constraint No. 2

If there are low frequency components in but a single primary, the high frequency components should be scaled from $Y_H'$. The specific scaling factor should include a gain of $1/A_c$ because, for a single primary, $Y_H' = A_c C_H'$, and $A_c$ is less than unity.

(iii) Constraint No. 3

Constraints Nos. 1 and 2 should be applied concurrently.

(iv) Constraint No. 4

For complementary colors comprised of essentially equal components of two primaries with the third primary absent, (1) there should be no high frequency component for the absent color and (2) the inferred components for the primaries present should be scaled from $Y_H'$. Specifically, if $C_1' = C_2'$ and $C_3' = 0$, then $Y_H' = (A_1 + A_2) C_1H' = (A_1 + A_2) C_2H'$. Hence, the scaling factor for the ratio of color highs to mixed highs for each primary with non-zero value should be $1/(A_1 + A_2)$. This constraint is automatically satisfied by processing in accordance with Equations (1) through (4), above, and certain approximations thereof.

(v) Constraint No. 5 (Optional)

An optional but preferred constraint is that the inferred high frequency components should maintain fidelity for intensity modulated colors, i.e., that the relative incremental changes in any gamma-corrected primary color signal ($C_1'$, $C_2'$ and $C_3'$) should bear the same proportion to the relative incremental changes in the primary color signal generated at the camera ($C_1$, $C_2$ and $C_3$). Specifically, the relative incremental changes should bear the following relationship:

$$\frac{\frac{dC_1}{C_1}}{\frac{dC_1'}{C_1'}} = \frac{\frac{dC_2}{C_2}}{\frac{dC_2'}{C_2'}} = \frac{\frac{dC_3}{C_3}}{\frac{dC_3'}{C_3'}} \quad \text{(Eq. 5)}$$

It can be shown that this constraint is met by color signals supplemented by inferred highs processed in accordance with Equations (1) through (4), above. Moreover, it is satisfied with reasonable accuracy near at least six radial lines in the chrominance plane for moderate nonlinear approximations of such processing.

D. The Use Of Thresholds and Nonlinearities

Representative processing equations for useful thresholds on a signal $x_{in}$ can be, but are not restricted to, equations of the general forms:

$$x_{out} = x_{in} \sqrt[A]{\frac{|x_{in}|^A + A_0^A}{|x_{in}|^A}} \quad \text{(Eq. 6)}$$

which is referred to here as a type-A threshold device, or $$X_{out} = X_{in} \sqrt[B]{\frac{|X_{in}|^B}{|X_{in}|^B + B_0^B}} \quad \text{(Eq. 7)}$$

which is referred to herein as a type-B threshold device. Here $A_o$ and $B_o$ determine the break points while A and B determine the threshold sharpness. For example, when applied to the processing of equation (1) the type-A would be used for the denominator component and the type-B for the numerator component. Using equation (1) for illustration, the result may be written generally as:

$$C_H'' - Y_H' = Y_H' \frac{(C' - Y)_L}{Y_L'} \sqrt[B]{\frac{|(C' - Y)_L|^B}{|(C' - Y)_L|^B + B_0^B}} \Bigg/ \sqrt[A]{\frac{|Y_L'|^A + A_0^A}{|Y_L'^A|}} \quad \text{(Eq. 8)}$$

Above the threshold region, the factor in brackets approaches unity, and the basic algorithm is attained.

An important class of non-linear approximations to the preferred form of the invention represented by processing in accordance with Equations (1) and (2) can be represented as a power law expansion of that processing. Processing of inferred highs components $C_{HM}''$ in accordance with an Mth power law expansion can be represented by the relation:

$$C_{HM}'' = Y_H' \left[ \frac{(C_L')^M}{\Sigma A_c (C_L')^M} \right] \quad \text{(Eq. 9)}$$

wherein M is a positive number other than zero. Since $\Sigma A_c C' = Y'$, it is important that $\Sigma A_c C_{HM}'' = Y_H'$. Hence capatibility with $Y_H'$ is here maintained for Mth power, non-linear processing. Furthermore, even though the resultant inferred independent highs can differ in magnitude and direction in color space from those obtained by processing in accordance with Equations (1) and (2), they will nonetheless maintain general conformance to constraints (1), (2), (3) and (4) described above.

The specific power law equations are indicative of non-linear translation characteristics of concave or convex shapes.

In a power law expression, if $M = 0$, there are no inferred highs. If M is less than one, e.g., $M = \frac{1}{2}$, $\frac{1}{3}$ or $\frac{1}{4}$, the inferred highs thus processed tend to emphasize the weaker primary colors, as compared to the case where $M = 1$, and to de-emphasize the stronger primary colors. If M is greater than one, the inferred highs thus processed tend to de-emphasize the weaker primary colors as compared to $M = 1$ and to emphasize the stronger primaries.

For a significant range of curvatures with M less than or greater than one, fidelity to $Y_L'$ tends to be much better than in conventional NTSC, PAL or SECAM receivers because constraint (1) is met, that is $C_{HM}''$ goes to zero as $C_L'$ goes to zero.

More generally if $M_c(x) \equiv \sum_{K=1}^{M} W_K x^K$ where the set $W_K$ are arbitrary constants, then it is possible to generate $C_{HM}''$ such that $$C_{HM}'' = Y_H' \left[ \frac{M_c(C_L')}{\Sigma A_c M_c(C_L')} \right] \quad \text{(Eq. 10)}$$

where again $\Sigma A_c C_{HM}'' = Y_H'$ and hence fidelity to $Y_H'$ is maintained, along with a major improvement in fidelity to $Y_L'$. The results are obviously also obtainable if the argument is proportional to the other derivable signals also proportional to $C_L'$ such as $$\frac{C_L'}{Y_L'} \text{ or } \frac{C_L'}{|\overline{Y_H'}|_{max}}, \text{ where } |\overline{Y_H'}|_{max}$$

represents a measured or estimated nonlinear measure of the one-sided peak amplitude of $Y_H'$ as smoothed with an effective bandwidth which may be roughly comparable to that of $Y_L'$.

E. Optional Boundary Constraints

It is also possible to put boundary constraints on the signals $C_1'$, $C_2'$ and $C_3'$. For example, if only positive values of $Y'$ were generated, one could generally write $Y_L' + Y_H' > 0$. This constraint is not necessarily applied at the camera and transmitter, but it is applied on monochrome pictures at the display since there is no negative light. A set of vertical black and white stripes recurring across the picture at a rate such that the fundamental is within the full monochrome bandwidth, $f_w$, but harmonics are not within $f_w$ could exceed this boundary.

It is possible to define a boundary processor in the receiver to reapportion the received mixed highs $Y_H'$ so that at least when $Y_L' + Y_H' > 0$, each $C_L' + C_H'' \geq 0$. As will be further explained in this specification, this may be attained by restricting the highs in one or two weaker primaries to insure that $C_L' + C_H'' \geq 0$, and maintain the relationship $\Sigma A_c(C_H'' - Y_H') = 0$.

The net result of such a process is to put more of the highs in the weaker colors, while suppressing the highs in absent colors, and, when only one color is present, applying $C_H'' = Y_H'/A_c$ in that color.

These general results are already obtainable as described above by a processor in accordance with Equation (9) or (10) where the curvature in such that the effective value of M in Equation (9) is less than unity, e.g., $M = \frac{1}{2}, \frac{1}{3}$ or $\frac{1}{4}$.

In addition the compliance with the bounary constraints is generally easily and effectively obtained by the central linear algorithms defined by Equations (1) and (2) above, since the relative ability of each color to carry the highs is proportional to its relative local color, $C_L'$.

F. Existence of Independent Highs

While not necessary to the basic invention it is useful to consider when independent highs may exist in the video signals.

Referring now to the gamma corrected color space in which $(R'-Y')$, $(B'-Y')$ and $Y'$ are defined on nominally orthogonal axes, optionally calibrated as the coordinates of the color transmission system, the full video bandwidth is represented at the receiver only by signals along the $Y'$ axis.

The existence of $Y'$ highs, may be measured by: (1) a monopolar, monotonic measure of $Y_H'$ such as $|Y_H'|$ or $(Y_H')^2$, or by (2) the sampled sum or integral of a measure such as $$\int \delta t (Y_H')^2 dt = \overline{Y_H'^2} \delta t$$

over an interval $\delta t$ here the interval $\delta t$ should be larger than $1/f_w$ and may be comparable to $1/f_L$; or (3) by any signal monotonically related to the above such as a local value or local mean value for $|Y_H'|_{MAX}$. The above are only measures of $Y'$ highs.

Independent highs exist, the particularly a need for inferred independent chrominance highs exists at least under the following conditions:

(1) Highs exist measurably in $Y_H'$, and may have characteristic definable features;

(2) The region in which highs exist has a local color different from white, that is, the local chrominance is not zero, or is, in form:

$$[b_R(R'-Y')_L^2 + b_B(B'-Y')_L^2] \geq \epsilon$$

or $$[b_I(I_L')^2 + b_Q(Q_L')^2] \geq \epsilon$$

where $\epsilon$ is a selectable threshold constant.

(3) The region in which the color exists is not in a major transition from one color to another, that is in form:

$$(1/\delta t)[b_r(d/dt(R'-Y')_L)^2 + b_b(\frac{d}{dt}(B'-Y')_L)^2]^{\frac{1}{2}}$$

is less than some constant.

Since the only signal component having both highs and lows is $Y'$, then the comparison of measures of the type based on wideband signals derived from $Y'$ may be more sharply defined in time.

For signals in which the measure falls below the threshold, optional circuits responsive to one or more specific waveforms may be used to derive control signals so that the independent highs operation may be enabled or disabled.

The independent highs exist at least when an appropriate measure of the local highs in some epoch $\delta t$ is large compared to an appropriate measure of change of $Y'$ lows in a comparable time, and concurrently the chrominance has a local value significantly and measurably different from zero.

Since the basic algorithm gives inferred components which go to zero when $Y_H'$ is zero or when $(C'-Y')_L$ is zero, the receiving systems based upon this algorithm tend to be self-disabling on these conditions.

In regions where independent highs exist, then such measures as $$\frac{\int (Y_H')^2 dt}{(d/dt Y_L'')^2} \text{ or } \frac{\int (Y_H'')^2 dt}{\int (d/dt Y_L'')^2 dt}$$

exceed a threshold. Here $Y_H''$ and $Y_L''$ are terms representative of $Y_H'$ and $Y_L'$ which are constrained to substantially non-overlapping passbands. $Y_H''$ and $Y_L''$ may be selected set of waveforms desirably chosen and used so that the threshold is exceeded only when independent highs exist. Signals representative of $Y_H'$ may have passbands intermediate $Y_H'$ and $Y_H''$.

Suitable pairs of signals one representative of $Y_H'$ and one representative of $Y_L'$ include:

(a) $d/dt Y_L''$ and $Y_H''$ restricted not to overlap in bandwith;

(b) $d/dt(Y_L')$ and $d/dt(Y_H')$ but are not restricted to these.

It is also possible to derive nonlinear measures of approximate epochs of existence of independent highs from integrated mean square or other monopolar measures based directly on ratios of terms such as in (a), (b) or (c) above.

It is also possible to use linear ratios such as a signal representative of $Y_H'$ and one representative of $d/dt Y_L'$ such as $$\frac{Y_H''}{d/dt(Y_L'')} \text{ or } \frac{d/dt\, Y_H'}{d/dt(Y_L')}$$

as normalized comparison waveforms. In regions of independent highs each of these ratios will be larger than some threshold except during intervals when $Y_H'$ or $Y_H''$ or $Y_H'$ go to zero. However, the pulses produced during these short intervals are removable by any conventional short pulse rejecting circuit, e.g., a pulse width discriminator. Furthermore these pulses occur at intervals when $(C_H'' - Y_H')$ and $C_H''$ would go to zero since both are proportional to $Y_H'$.

Thus the independent highs may be used
(a) full on
(b) enabled during selected periods
(c) disabled during selected periods.

In addition, the independent highs may be optionally turned off where a measure of the ratio of highs to lows such as $Y_H'^2/Y_L'^2$ is so large as to indicate an excessively noisy signal.

Measurements on Y' highs only, which show compatible or recognizable waveform shapes may also be used to detect a need for inferred independent chrominance highs. This may include recognition of specific waveform features within the highs.

These may include; local integrated measures such as rate of zero crossings, that is effective number per transient epoch $T_s$ corresponding to the bandwidth of monochrome lows and corresponding chrominance lows; recognition of specific waveforms, or comparative measures based on a plurality of portions of $Y_H''$.

Enabling or disabling systems for independent highs may then be responsive to signal conditions measured by signals derived from one or more of (1) $Y_H'$, (2) chrominance, (3) chrominance rate of change, (4) monochrome lows rate of change, or (5) monochrome lows.

G. Response to Sine Waves

The independent highs mode algorithm as presented produces substantially improved response to signals which may involve sinusoidal chrominance components at frequencies above the received chrominance passband. For chrominance components in the overlap region between a $(C'-Y')_L$ or $Y_L'$ passband and the complementary $Y_H'$, where the lowpass characteristic has a tapered or slow roll-off consistent with low time spreading, the independent highs algorithm tends to produce improved fidelity. For single primary colors the correction is complete as will be shown. For sinusoidal components in the presence of steady local values in other primaries, it is only partially correct.

Let the effective chrominance passband have a shape below a nominal frequency $f_1$ be defined by $F_L(f)$ for $f < f_1$. Then $Y_L'$ has the same passband shape and $Y_H'$ has one which is the complement, $(1-F_2(f))$ for $f < f_1$. Let $F_L(f) = F_{Lo}$ at $f = f_o$ and $W_o = 2\pi f_o$. Consider a single primary color with a low frequency sine wave defined as $C_1' = C_1' + C_1' \sin W_o t$ at the transmitter then $C_{1L}' = C_{1o}' + F_{Lo} C_1' \sin W_o t$, $Y_L' = A_1 C_{1o}' + F_{Lo} A_1 C_1' \sin W_o t$ and $Y_H' = (1-F_{Lo}) A_1 C_1' \sin W_o t$. Conventionally, $C_{1L}' + Y_H' = C_{1o}' + C_1' \sin W_o t(F_{Lo} + A_1(1-F_{Lo}))$ and the sine wave amplitude is reduced because of amplitude roll-off or taper of the chrominance channel response. This gradual roll-off is used to minimize time smear and prevent ringing. Wideband chrominance receivers tend at least to pick up more cross color energy from Y' into the chrominance channel. For a single primary, with the independent algorithm, $$C_{1L}' + C_{1H}' = C_{1o}' + F_{Lo} C_1' \sin W_o t +$$
$$A_1 C_1'(1 - F_{Lo}) \sin W_o t \frac{C_{1o}' + C_1' F_{Lo} \sin W_o t}{A_1 C_{1o}' + A_1 C_1' F_{Lo} \sin W_o t} =$$
$$C_{1o}' C' \sin W_o t.$$

When there are non-zero color values in the other primaries, the correction is less complete but the effect is masked by those colors anyway. Thus it is useful to have available independent highs fully enabled as a design choice.

Mode control systems for enabling or disabling the independent mode algorithm can be set to respond only to independent highs above the chrominance passband using circuits described herein. Thus alternatively it is optionally possible to constrain enabling of the independent mode except for components of $Y_H'$ above the nominal cut-off of $Y_L'$. This is an example of the use of nonlinear processing to obtain the effective benefits of square-off passbands without the conventionally associated delay and time spreading.

H. Relation to Cross Color Due to Band Sharing

By providing television receiving systems with enhanced resolution as compared to current receiving systems, the present invention reduces the necessity to rely on portions of the chrominance band subject to cross color, and thus can permit reduction of cross color due to band sharing.

Cross color represents a significant problem in current television receiving systems. Cross color results from the use of band sharing wherein the Y' signal occupies a band concurrently with a chrominance signal. Cross talk from the Y' signal into the chrominance channel produces spurious chrominance which is rendered more visible by nonlinear processing on display. A high resolution image, which may be colorless, can have detail picked up as cross color averaging purple. It has residual luminance due to rectification by the display gamma characteristic, and if the image moves, it can produce low frequency luminance flicker which is highly noticeable to the human eye.

In addition to providing improved performance at the receiver, the present invention could permit future transmission practice to further reduce interference by constraining the I' bandwidth to the double sideband Q' bandwidth at the transmitter and by constraining the Y' bandwidth so that it does not overlap the chrominance.

I. Relation to Color Primaries

Ideal correction for change of colorimetric primaries for use in color television signal displays in which the primaries are not the same as those used at the transmitter for NTSC-type signals, generally would involve the following steps:
(1) Derive $C_1'$, $C_2'$, $C_3'$
(2) Derive $C_1$, $C_2$, $C_3$
(3) Matrix to $C_a$, $C_b$, $C_c$
(4) Reapply gamma to get $C_a'$, $C_b'$, $C_c'$ and apply to picture display.

Various approximations are commonly used to simplify the correction algorithms.

The present invention is not compatible with such approximations, and, by providing more accurate signals $C_1''$, $C_2''$ and $C_3''$ in the full bandwidth $f_w$, this invention can improve the limit of potentially available performance.

BRIEF DESCRIPTION OF THE DRAWINGS

The advantages, nature and various additional features of the present invention will appear more fully upon consideration of the illustrative embodiments now to be described in detail in connection with the accompanying drawings in which:

FIGS. 1(A)–(J) are illustrative color television signal waveforms which illustrate the operational concepts and methods of the invention;

FIGS. 2 and 3 are graphical illustrations of chrominance planes illustrating relative regions of accurate reproduction provided by the present invention as compared with a typical conventional receiving system in the presence of independent highs;

FIG. 5 is a graphical representation illustrating the transfer characteristic of a type-A threshold device;

FIG. 6 is a graphical representation illustrating the transfer characteristic of a type-B threshold device;

FIGS. 7A, 7B, and 7C are simplified block diagrams of alternative equivalent control signal generators;

FIG. 14 is simplified block diagram of a parametric form of inferred independent highs signal processing circuits in accordance with the invention;

For convenience of reference, similar elements are designated by the same reference numeral throughout the drawings.

Figure 4:
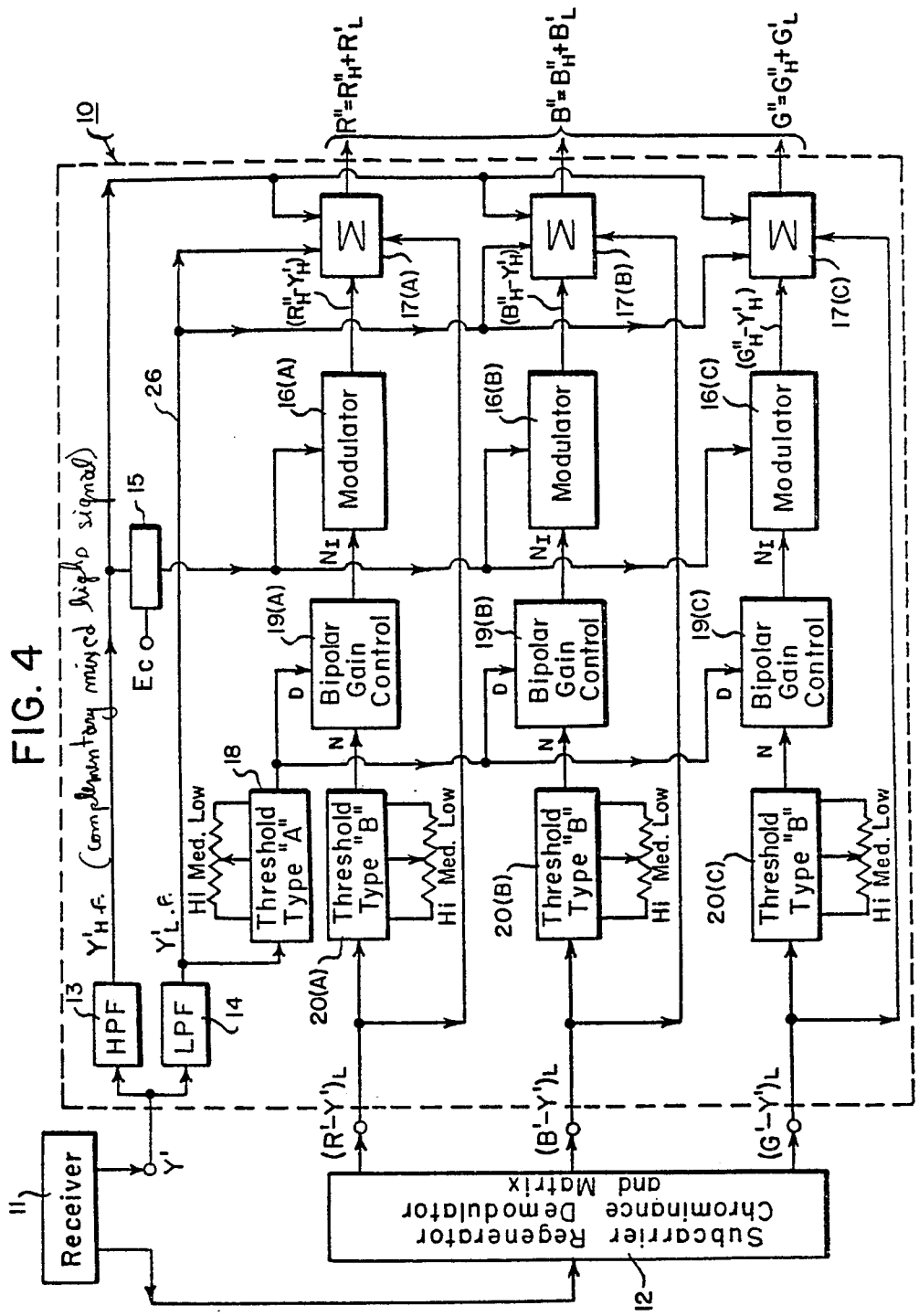
FIG. 4 is a block diagram of an inferred highs signal processing circuit in accordance with a first embodiment of the invention, said circuit being suitable for operation in a conventional color receiver having equal bandwidth chrominance channels.

DETAILED DESCRIPTION (a) Waveforms Illustrating Alternatives Processing of Independent Highs (FIG. 1)

Referring to the drawings, FIGS. 1(A) through (J) show exemplary color television signal waveforms which illustrate the operational concepts and methods of the invention.

The signal waveforms shown in FIGS. 1(A) through 1(D) depict the respective transmitter primary color signal components (R', G' and B') and the monochrome video signal Y' for a saturated red image containing high frequency components above the bandwidth of the chrominance channel. As shown in FIG. 1(A) the saturated red signal then may be represented as:

$$R' = R_L' + R_H' \cos W_o t$$

where $R_L'$ is the average or low frequency component of the saturated red signal and $R_H' \cos W_o t$ is the high frequency component which is above the standard transmitter and receiver chrominance bandwidth but within the bandwidth of the monochrome signal Y'. For such a saturated red image the green and blue signal components are zero and the monochrome signal is represented as $$Y' = A_r R_L' + A_r R_H' \cos W_o t$$

where $A_r$ is the luminance coefficient constant for red.

The corresponding signal components translated at the receiver as low frequency primary color difference signals are as follows:

$$(R' - Y')_L = R_L'(1 - A_r)$$

$$(B' - Y')_L = -A_r R_L'$$

$$(G' - Y')_L = -A_r R_L'$$

The above chrominance signals when combined with the normal mixed high frequency signals produce the composite receiver primary display signals $R_R'$, $G_R'$ and $B_R'$ shown in FIG. 1(E), (F), (G). The blue and green signals G' and B' produce rectified pulses of cyan light which desaturate the red image without producing correct luminance highs or lows.

In accordance with one embodiment of the present invention, color signals of the type illustrated FIGS. 1(E) through (G) are supplemented with inferred independent high frequency chrominance components so that they will more accurately portray the color signals actually generated at the camera. In one exemplary method, the composite low frequency color signals $R_L'$, $G_L'$ and $B_L'$ are supplemented by inferred high frequency components equal to the product of (1) the high frequency portion $Y_H'$ of the monochrome signal Y' which exceeds the bandwidth of the chrominance signal and (2) the ratio of the reduced bandwidth primary color signal $C_L'$ to the low frequency portion $Y_L'$ of the monochrome signal which has a bandwidth or frequency range comparable to that of the reduced bandwidth color signal, i.e., the net inferred high frequency component $C_H''$ is given by the relation:

$$C_H'' = Y_H' \left[ \frac{C_L'}{Y_L'} \right]$$

In the specific case of the signal examples shown in FIGS. 1(E) through (G), the inferred high frequency color signals are then as follows after correction:

$$R_H'' = (A_r R_H' \cos W_o t) \frac{R_L'}{A_r R_L'} = R_H' \cos W_o t$$

$$B_H'' = 0$$

$$G_H''=0$$

The resultant receiver display signals corrected by the method of inferred independent highs are illustrated in FIGS. 1 (H)–(J). It will be noted that the undesired green and blue high frequency components which produce desaturation have been reduced to zero and the amplitude of red signal has been increased in amplitude to match the amplitude of the high frequency transmitter component as illustrated in FIG. 1(A). Thus, by using the method of inferred independent highs it will be recognized that the transmitter signal can be accurately reconstituted at the receiver both with regard to chromaticity and luminance. While the above simplified explanation illustrates the corrective operation of inferred independent highs with but a single saturated primary color, as explained with regard to constraints 1 through 5 when more than one primary exists in a highly colored area, the algorithms of Equation (1) or Equation (2), whichever is used, are capable of producing measurable and significant improvements in the color television images.

(b) Coverage in the Chrominance Plane (FIGS. 2 and 3)

The advantages of the present invention may be seen more generally by reference to FIGS. 2 and 3 which are alternative graphical illustrations of the chrominance plane showing the regions having properly proportioned color highs and lows, first for a typical conventional color television receiving system and then for a receiving system in accordance with this invention. As illustrated in FIG. 2, a conventional receiving system provides correct high frequency components at but a single point corresponding to white, and the region of nearly correct highs is approximately represented by a small region about this point. In contrast, as illustrated in FIG. 3, for receiving systems utilizing processing of inferred independent highs in accordance with Equations (1) and (2), above, the high frequency components are basically correct along or in the vicinity of the six lines shown; this is a demonstrable consequence of the fact that these central algorithms meet the constraints defined hereinabove. Moreover, for the common and important case of intensity modulated colors, the region of nearly correct highs can extend over the entire chrominance plane.

(c) Equiband Receiver with Inferred Independent Highs Correction Circuitry (FIG. 4).

Shown in FIG. 4 is a simplified block diagram of an inferred independent highs signal processing circuit 10 operating in a conventional color television receiver 11. Receiver 11 includes standard chrominance demodulator and matrix circuits 12 which produce three chrominance signals $(R'-Y')_L$, $(B'-Y')_L$ and $(G'-Y')_L$ each having equal low bandwidths of about 0.5 mhz. The monochrome signal $Y'$, translated with a bandwidth of about 3 mhz, is supplied as shown to high-pass filter 13 and low-pass filter 14 for the purpose of dividing the signal into its high frequency and low frequency components $Y_H'$ and $Y_L'$ respectively. The bandwidth of low-pass filter 14 is selected to match that of the low-bandwidth chrominance channels, and the bandwidth of high-pass filter 13, complementary to filter 14, typically extends from about 0.5 mhz to the upper cut-off frequency of the monochrome channel while that of filter 14 extends up to about 0.5 mhz.

The complementary mixed highs signal $Y_H'$ from the output of filter 13 is supplied via selectable gain control 15 to inferred highs modulators 16(A), 16(B) and 16(C), which preferably can be four quadrant multipliers, and as a bypassed mixed highs signal to summing circuits 17(A), 17(B) and 17(C) as shown. Signal $Y_L'$ is supplied to the summing circuits and, through an adjustable A-type threshold, 18 to the denominator inputs D of respective ratio measuring bipolar gain control devices 19(A), 19(B) and 19(C) as shown. Chrominance signal $(R'-Y')_L$ is supplied through adjustable B-type threshold 20(A) the numerator input N of bipolar gain control device 19(A). In similar fashion $(B'-Y')_L$ is supplied through B-type threshold 20(B) to numerator input N of control device 19(B) and signal $(G'-Y')_L$ is supplied to numerator input N of device 19(C) through B-type threshold 20(C). The red channel chrominance signal $(R'-Y')_L$ is connected by lead 50 to summing circuit 17(A); the corresponding blue channel chrominance signal is connected by 41 to summing circuit 17(B) and the green channel chrominance signal is supplied to summing circuit 17(C).

The function of bipolar gain control devices 19(A)–19(C) is to measure the amplitude ratio for the respective input signals supplied to the N and D inputs and provide an output inferred independent highs gain control signal $N_I$. The separate inferred highs gain control signals, each generally denoted as $N_I$, are supplied to the respective modulation gain control input terminals of channel modulators 16(A), 16(B) and 16(C). Modulators supply the desired gain-modulated inferred independent chrominance highs signals $(R_H''-Y_H')$, $(B_H''-Y_H')$ and $(G_H''-Y_H')$ in accordance with Equation (1) above. The respective inferred signals are combined in summing circuits 17(A)–17(C) with (1) the standard low frequency chrominance signal, (2) the low frequency monochrome signal $Y_L'$ and (3) the by-passed mixed highs component $Y_H'$ to produce the desired corrected composite primary color display signals provided to the receiver display (not shown):

$$R''=R_L'+R_H''=(R'-Y')_L+Y_L'+Y_H'+(R_H'' -Y_H')$$

$$G''=G_L'+G_H''=(G'-Y')_L+Y_L'+Y_H'+(G_H'' -Y_H')$$

$$B''=B_L'+B_H''=(B'-Y')_L+Y_L'+Y_H'+(B_H'' -Y_H')$$

Conventional means, (not shown) are provided for time equalization of $Y_L'$, $Y_H'$ and the reduced bandwidth chrominance signals so that the respective signal waveforms are all time coordinated.

In one form, complementary filters $Y_H'$ and $Y_L'$ may be formed from signals summed from sets of taps on a tapped delay line which then also provides the chrominance channel delay equalization to the $Y'$ signal.

In a preferred alternative form of the invention, only two of the inferred independent chrominance high signals $(R_H''-Y_H')$, $(B_H''-Y_H')$ and $(G_H''-Y_H')$ need be generated, with the third such being derived from the first two by a conventional linear matrix in accordance with the equation $\Sigma A_c(C_H''-Y_H')=0$.

Selectable gain control element 15, operatively controlled by control signal $E_c$, is advantageously provided as a means for adjusting the amplitude of the inferred independent high frequency correction components. Where desired $E_c$ may serve as an enabling switch to enable the inferred independent highs mode during any appropriate period of time, or to disable the mode during any appropriate period of time as well as to set its gain.

Alternatively, selectable and comparably controlled gain control devices can perform the comparable functions by elements in series anywhere in the sequence to which the inferred highs are proportional, or by an inverse control in the sequence from $Y_L'$.

(d) Exemplary Circuit Components (FIGS. 4, 5 and 6)

As shown, a nonlinear element 18 designated nonliner element A (NLE A) or as a type-A threshold element is advantageously utilized as a nonlinear constraint on the denominator signal supplied to the D inputs of ratio circuits 19. A suitable transfer characteristic for such a threshold device is shown in FIG. 5. The operating function of threshold 18 is to prevent the denominator signal from diminishing in amplitude below a predetermined minimum value and thus prevent division in the ratio measuring circuits 19(A)–19(C) by extremely small signals. The threshold level is optionally made selectable among low, medium or high values.

A type-B threshold device 20 having a stepped transfer characteristic as shown in FIG. 6 is advantageously used to selectively control the lowest level of chrominance signals supplied to the numerator inputs of ratio circuits 19. The operating function of these thresholds is to optionally reject the measurement of numerator chrominance signals that fall below the selected threshold amplitude and thus suppress unneeded corrections for white or near-white signals. Where desired the B threshold may be omitted or effectively adjusted to such a low threshold value as to render the overall transfer characteristic linear.

FIGS. 7(A)-(C) illustrate ratio circuits 19 employing alternative arrangements of similar components using multiplication or division.

In the arrangement of FIG. 7(A), the denominator input signal is inverted in inverter circuit 70 and multiplied by the numerator input signal in multiplier 71.

The arrangement of FIG. 7(B) is substantially identical to that shown in FIG. 7(A) except that a limiter 72 is disposed between the inverter 70 and the multiplier 71. The limiter prevents unduly high signals from small denominator signals.

In the threshold arrangement of FIG. 7(C), the denominator signal is applied first to a type-A threshold device 18 and thence both it and the numerator signal are applied to the input terminals of the ratio circuit 19.

All of the above-named circuit elements, including type-A and type-B threshold devices, ratio-measuring bipolar gain controls and modulators are standard available signal processing elements; and, in all cases, it is contemplated that the entire processing circuit can be manufactured as a small low-cost integrated circuit chip, either separately or in combination with other receiver processing circuits.

Figure 8:
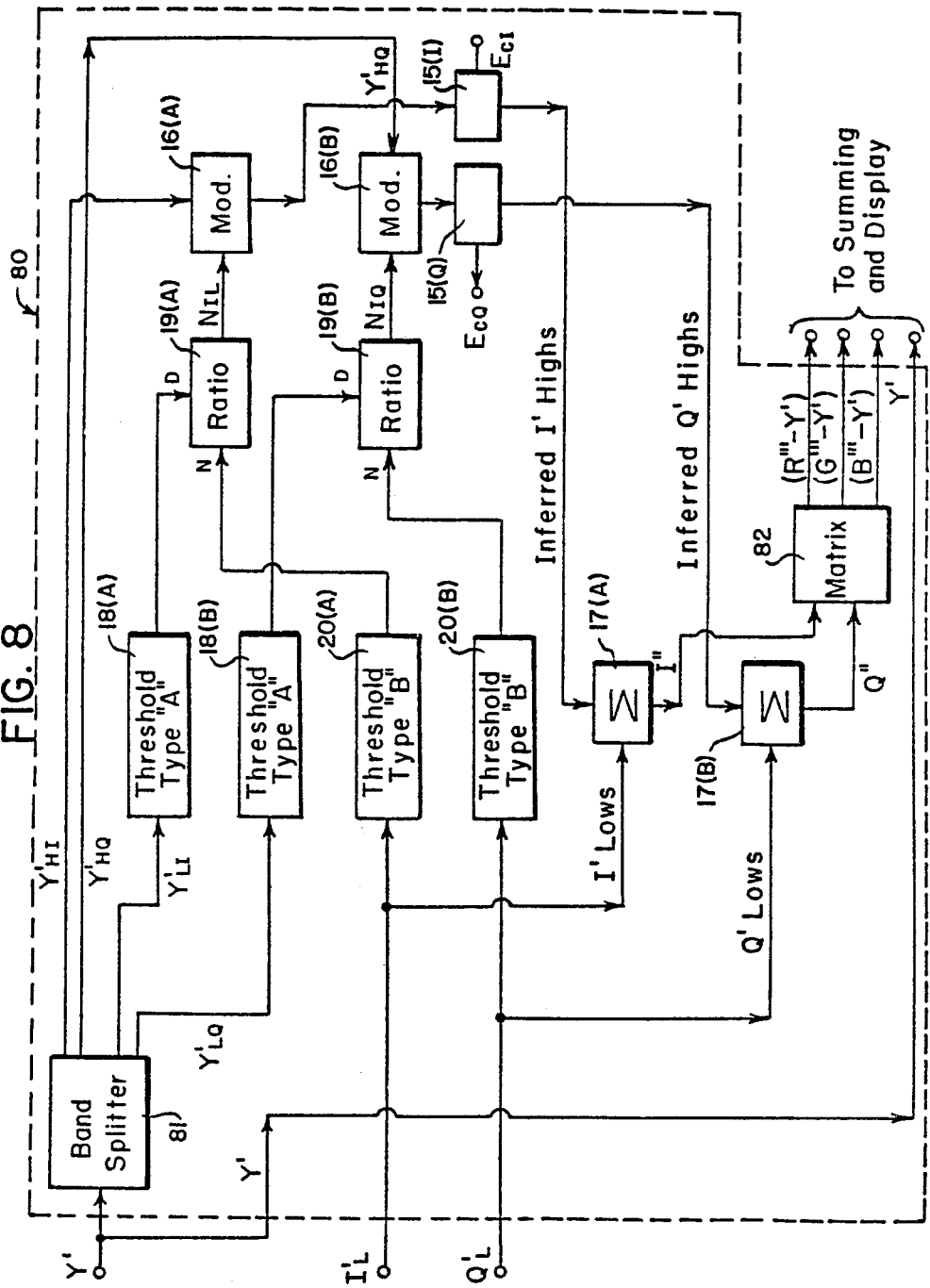
FIG. 8 is a block diagram of an inferred independent highs signal processing circuit in accordance with a second embodiment of the invention, said circuit being suitable for operation in a conventional color receiver having unequal bandwidth chrominance channels.

(e) Unequal Band Receiver With Inferred Step Highs Correction Circuitry (FIG. 8)

The block diagram of FIG. 8 illustrates the application of an inferred independent highs processing circuit 80 in a color television receiver utilizing two unequal bandwidth chrominance signals, namely $I_L'$ and $Q_L'$. All of the circuit elements including the A and B threshold devices, the ratio measuring bipolar gain controls and the modulators are the same in operation as those devices shown in FIG. 4.

In the operation of the circuit of FIG. 8, the wideband monochrome signal $Y'$ is supplied to a band splitter 81 which serves to divide the $Y'$ signal into two pairs of frequency bands: (1) $Y_{LI}'$ matching that of $I_L'$; (2) $Y_{HI}'$ having a complementary bandwidth thereto within the video bandwidth occupied by $Y'$; (3) $Y_{LQ}'$ matching that of the $Q_L'$ chrominance channel, and (4) $Y_{HQ}'$ having a complementary bandwidth thereto within the bandwidth of $Y'$. The high frequency monochrome components $Y_{HI}'$ and $Y_{HQ}'$ are supplied as inputs to the inferred highs modulators 16(A) and 16(B) respectively. $Y_{LI}'$ is supplied through an A-type threshold 18(A) to the denominator input terminal D of ratio measuring bipolar gain control 19(A) and $I_L'$ is supplied through B-type threshold 20(A) to the numerator input terminal N of 19(A). An inferred independent highs gain control signal $N_{IL}$ is supplied by 19(A) to the gain input terminal of 16(A) to multiply $Y_{HI}'$ and to produce an inferred highs signal $I_H''$ which is combined with the $I'$ lows in summation circuit 17(A) to provide a composite output signal to matrix 82.

In similar manner $Y_{LQ}'$ is supplied to the D terminal of ratio measuring bipolar gain control 19(B) through type-A threshold 18(B); and chrominance signal $Q_L'$ is supplied to the numerator terminal N of 19(B) through type-B threshold 20(B). The gain control signal $N_{IQ}$ supplied by 19(B) to 16(B) is proportional in in amplitude to the ratio of the signals supplied to the N and D input terminals, and the $Y_{HQ}'$ signal is multiplied by $N_{IQ}$ to produce an inferred highs signal $Q_H''$ that is combined with $Q'$ lows in summation circuit 17B to produce a composite output signal $Q''$ to matrix 82.

The composite inferred highs correction signals $I''$ and $Q''$ are combined in a conventional linear matrix 82 to produce the desired red, green and blue corrected display signals $(R''''-Y')$, $(G'''-Y')$ and $(B'''-Y')$. These signals and $Y'$ are conventionally provided for summing and display (not shown).

Operation controls 15(Q) and 15(I) are advantageously provided to control the level of the inferred highs signals supplied from the $I'$ and $Q'$ modulators 16(A) and 16(B), respectively, by means of control signals $E_{cQ}$ and $E_{cI}$.

Figure 9:
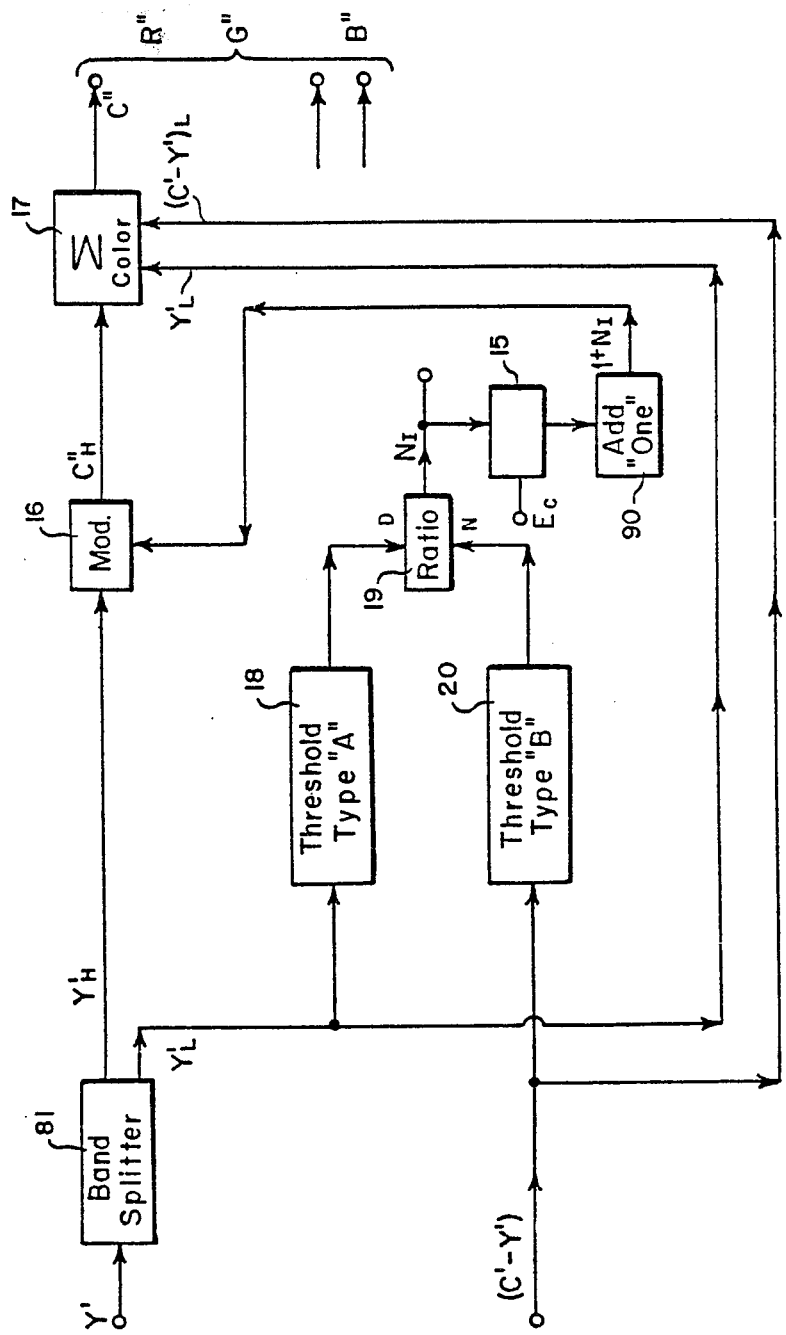
FIG. 9 is a simplified block diagram of an inferred independent highs color signal processing circuit.

(f) Receiver With Inferred Independent Highs Color Color Correction Signals Processed from Chrominance Signals (FIG. 9)

Referring to FIG. 9 there is shown an embodiment of an unbypassed type inferred highs processing circuit in which the inferred highs color signal $C_H''$ is generated instead of the chrominance highs. In this embodiment, chrominance signal $(C'-Y')_L$ is supplied to the numerator input N of the ratio measuring gain control circuit 19 through an optional B-type threshold 20. The low frequency monochrome signal $Y_L'$ from band splitter 81 is supplied to the denominator input D of 19 through a type-A threshold 18 as shown. Circuit 19 generates an output gain control signal $N_I$ proportional in amplitude to the ratio of the signal components supplied to the N and D input terminals.

Signal $N_I$ is supplied to an "add-one" circuit 90 which generates and supplies the desired gain control signal $(1+N_I)$ to modulator 16. Control device 15 can enable, disable or otherwise control the signal $N_I$ without upsetting the reference voltage 1 which is inserted in 90.

Modulator 16 generates the desired inferred color highs signal $C_H''$ which is summed at summing circuit 17 with $Y_L'$ and chrominance signal $(C'-Y')_L$ to produce the desired composite color signal $C''=C_H''+C_L'$ for each of the required colors.

In the inferred highs processing circuits shown in FIG. 9 using the method of direct generation of color highs, the generated inferred color highs signal is:

$$C_H'' = Y_H' \frac{C_L'}{Y_L'} = (1 + N_I)Y_H'$$

In the circuits shown in FIGS. 4 and 8 using the method generation of chrominance highs, the inferred chrominance highs signals is:

$$(C_H'' - Y_H') = Y_H' \frac{(C - Y)_L}{Y_L'} = N_I Y_H'$$

Both methods and circuits satisfy the condition that $\Sigma A_c C_H'' = Y_H'$ and thus the added inferred independent highs maintain fidelity to the transmitted $Y_H'$. Further because the overmodulation and rectification of mixed highs of conventional receivers has been removed, fidelity is maintained to the transmitted $Y_L'$.

(g) Circuit Elements for Estimating The Local Amplitude of The Y' Highs (FIG. 10)

Figure 10A:
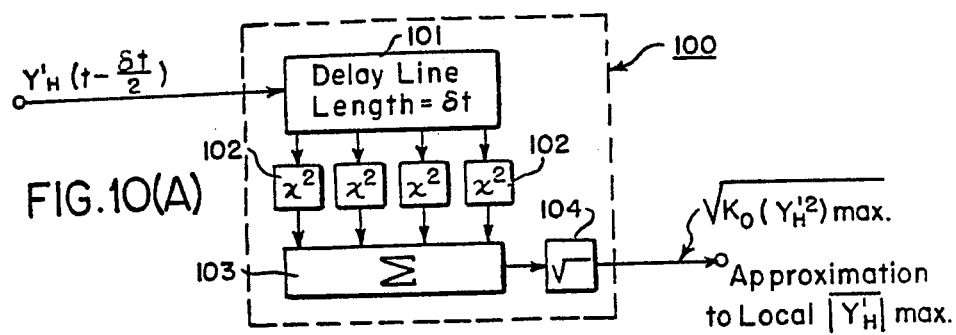
FIGS. 10A–10C present circuit elements for estimating the local amplitude of Y' highs.
Figure 10B:
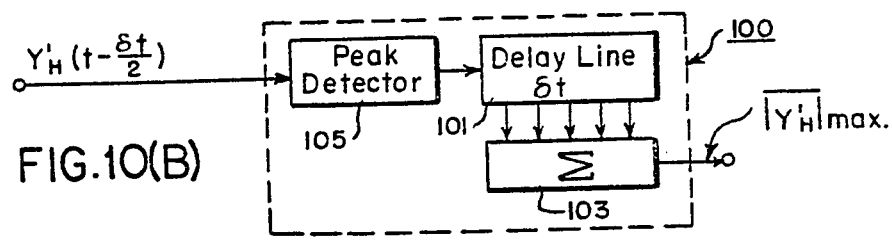
Figure 10C:
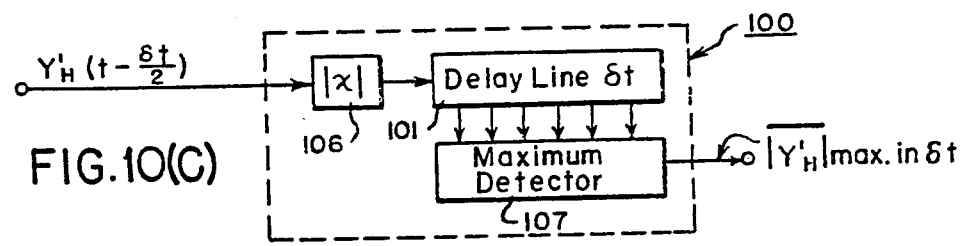
Figure 17A:
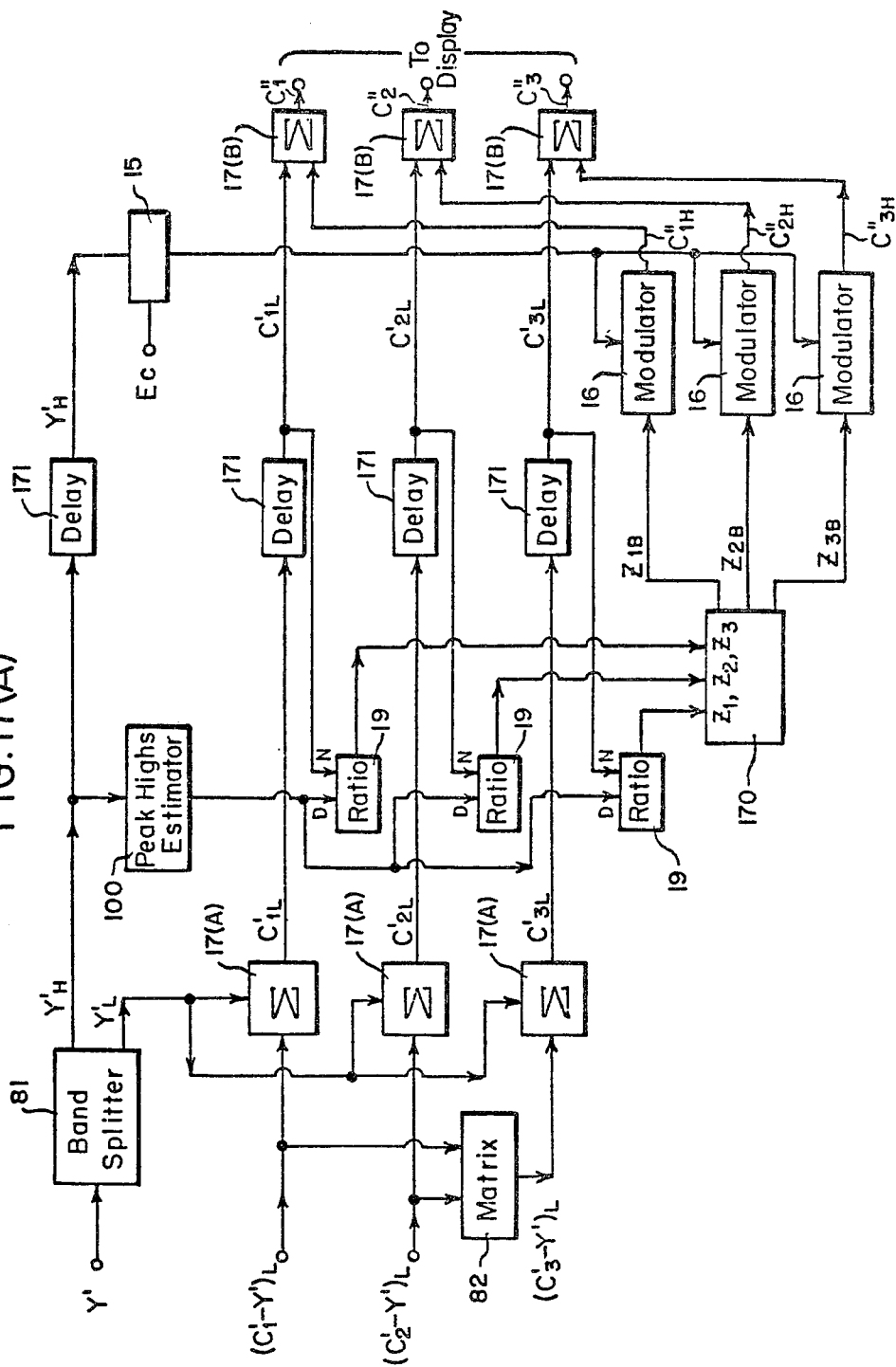
FIGS. 17(A) and 17(B) illustrate an alternative boundary constraint processor in accordance with the invention.

FIGS. 10(A)–(C) show alternative circuit elements 100 for estimating the local amplitude of the Y' highs. Use of such a circuit element is illustrated in FIG. 17A.

In each of the circuit elements of FIGS. 10(A)–(C) a signal representative of $Y_H'$ and at appropriate amplitudes is supplied to each highs estimating circuit 100 to provide an estimate of the peak highs.

In FIG. 10(A) the signal is applied to delay line 101 which can, for example, have a delay $\delta t$ comparable to the transient epoch of $Y_L'$. Tapped signals are squared in squarers 102 and summed in summing circuit 103. The output of element 100 is rooted (square root in this example) in extraction circuit 104 to give an output signal which is an approximation to the local measured value of peak highs, $|Y_H'|_{MAX}$.

In FIG. 10(B) the signal representing $Y_H'$ is peak detected in element 105 before the mean peak value $|Y_H'|_{MAX}$ is estimated by 101 and 103.

In FIG. 10(C) the rectified or mean value is detected in element 106, supplied to delay line 101 and the largest value on any tap is detected in 107 to provide the estimate of $|Y'_H|_{MAX}$ within $\delta t$.

The summing in element 103 can be a weighted sum giving, for example, larger weights to signals from near the middle of the delay line than to those near the ends.

(h) Circuits Related To Generation Of Enabling And Disabling Control Signals For Independent Highs (FIG. 11)

FIGS. 11(A)–(D) present circuit means and methods for generation of enabling or disabling signals for independent highs.

Figure 11A:
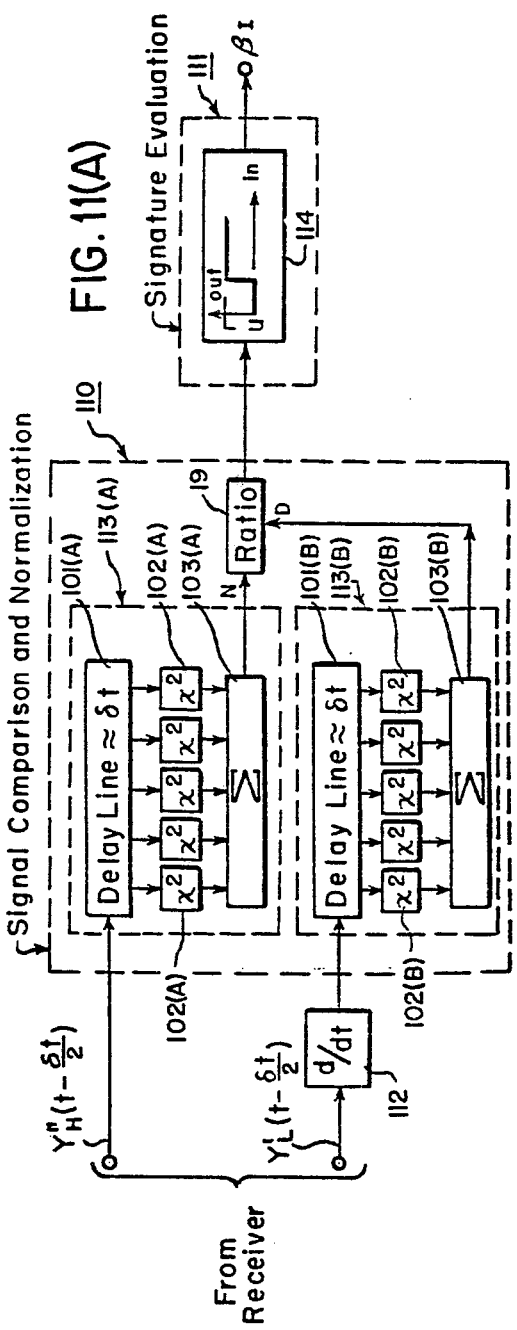
FIGS. 11A–11P present circuits related to generation of enabling or disabling control signals for independent highs.

FIG. 11(A) shows circuit means for comparing a first signal $Y'''(t-\delta t/2)$ representative of $Y_H'$ with a second signal $d/dt(Y_L'(t-\delta t/2))$ representative of the rate of change of $Y_L'$ in a signal comparison and normalization circuit 110, the output of which is supplied to a signature evaluation circuit 111 to recognize the approximate epoch in which independent highs are indicated by the Y' component.

The input signals are processed through integrating elements 113(A) and 113(B), respectively, similar to that of FIG. 10(A). The signal supplied from $Y_L'$ to element 110 is first differentiated in differentiating circuit 112. This is preferably of the type comprising the signal difference between two samples of the same signal closely spaced in time as compared to the modulation rate permitted by the bandwidth.

The signal derived from $Y_L'$ may be processed about a shorter interval than that for the $Y_H'$ derived signal but still centered at $\delta t/2$. The ratio is computed in element 19 and fed to signature evaluation circuit 111 which here comprises amplitude threshold 114. When independent highs exist they drive the signal over the threshold. The output signal $(\beta_I)$ equals 1 in this condition, and zero below the threshold. This may be used to activate elements 15 in the several embodiments shown herein by providing an enabling voltage $E_c$ controlled by $(\beta_I)$.

Figure 11B:
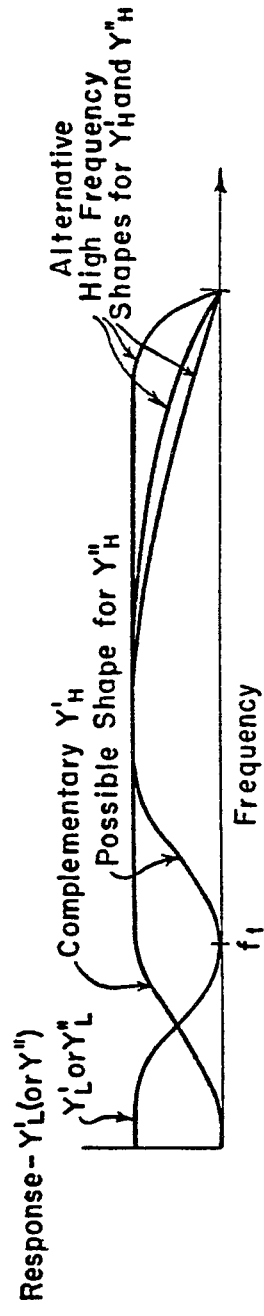

FIG. 11(B) shows frequency response curves. These include one representative of $Y_L'$ or $Y_L''$ on another scale factor, and complementary signals $Y_H'$ having some alternative shapes at the high frequency end. A possible shape for $Y_H''$ not overlapping $Y_L'$ (or $Y_L''$) is also shown; it has a slow rate of change of amplitude with frequency to constrain waveform spreading.

Figure 11C:
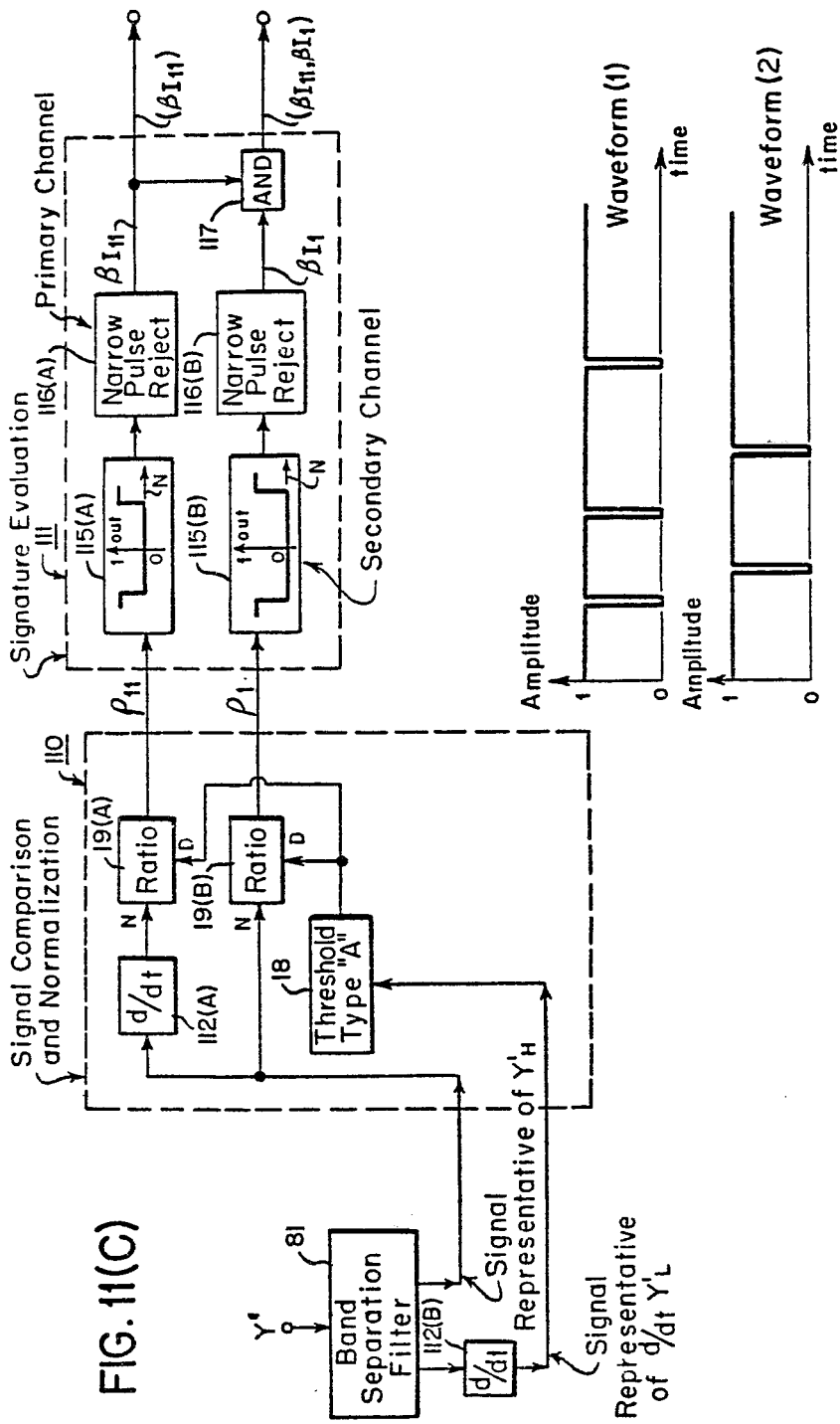

FIG. 11(C) shows a band separation filter 81 supplied by Y' from the receiver (not shown). It provides a signal representative of $Y_H'$ and a signal representative of $Y_L'$ to signal comparison and normalization circuit 110.

Signal $Y_L'$ is differentiated in element 112(B):passed through a bipolar type-A threshold 18 which provides a threshold for each polarity; and is applied to the denominator input terminals of ratio circuits 19(A) and 19(B). Signal $Y_H'$ is similarly differentiated in an element 112(A) shown and applied to the numerator input of ratio circuit 19(A). This produces an output signal here designated $\rho_{11}$.

Similarly $Y_H'$ is directly applied to the numerator input of ratio circuit 19(B) which has output signal $\rho_1$.

Signal $\rho_{11}$ is fed to a primary channel in signature evaluation circuit 111 and signal $\rho_1$ is optionally fed to a secondary channel in element 111.

Signal $\rho_{11}$ is supplied to amplitude window 115(A) and through a narrow pulse reject or pulse width discrimination circuit 116(A) to provide an output signal $(\beta_{I11})$. Waveform (1) shows this waveform, prior to narrow pulse rejection, on independent highs. The output $\beta_{I11}$ is unity on independent highs and can be used to actuate or confirm enabling through an element such as 15 and its control voltage $E_c$.

Optionally signal $\rho_1$ is similarly processed through 115(B) and 116(B) to produce $\beta_{I1}$ which may confirm the unity signal of $\beta_{I11}$ in AND circuit 117 to produce an output $)\beta_{I11} \beta_{I1})$. This can enable the independent highs mode when it is unity.

Waveform (2) shows the location of zero crossling spikes at the output of 115(A) which are interlaced with those at the output of 115(B) as illustrated in curve (1).

The circuits of FIGS. 11(A) and 11(C) may be used to enable or disable the independent highs operation as the output is unity or zero. As one alternative to these, signals like $\rho_{11}$ or $\rho_1$ could be fed through an element 113 to an element 114 to produce a possible indication of existence of independent highs.

It is here noted that the embodiment illustrated in FIG. 11(C) has no substantial internal delay and produces a control signal with minimal spreading in time.

Thus there has been presented circuit means responsive to the Y' signal including signal separation means for providing at least one pair of signals derived therefrom for signal comparison and normalization to provide a waveform generally occupying one amplitude range during independent highs and another in their absence, and circuit means for responding to the presence of said amplitude to provide a control to enable or disable independent highs operation thereupon.

There has also been presented similar circuit means responsive to a high frequency signal source essentially in quadrature thereto to similarly derive a second control signal and apply said second control signal to confirm the enabling mode of the first control signal by concurrency of enabling.

Figure 11D:
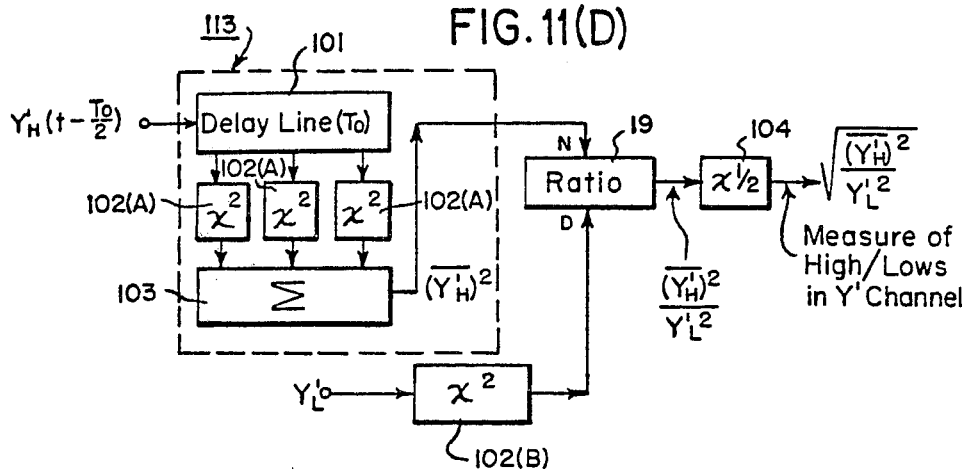

FIG. 11(D) shows how a circuit such as 113 may be used to combine a signal derived from $Y_H'$ with a signal representative of $Y_L'$ (not differentiated) as comparably non-linearly processed in squaring circuit 102(B) and compared in ratio circuit 19 to provide a measure of highs to lows in Y'. Optional rooting circuit 104 restores dimensionality. The output signal may be used to activate a threshold at high ratios indicative of an excessively noisy signal which can optionally disable the independent highs mode acting similarly through an element 15 and voltage $E_c$.

(i) Generalized Thresholding For Independent Highs Generators (FIG. 12)

Figure 12A:
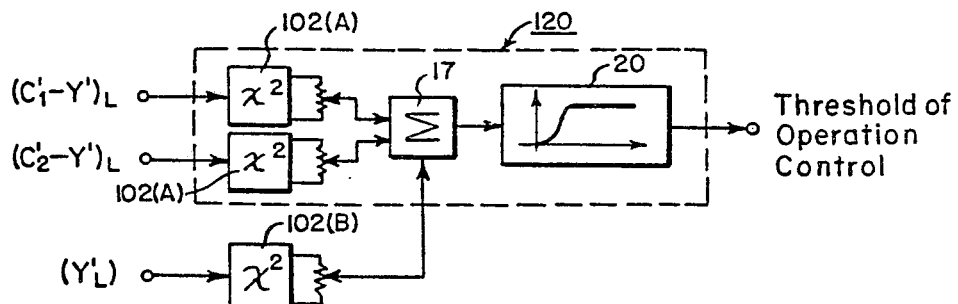
FIGS. 12A–12B show generalized thresholding for independent high generators.

FIG. 12(A) shows a chrominance plane minimum threshold generator 120 responsive to inputs $(C_1'-Y')_L$ and $(C_2'-Y')_L$ through squaring or comparable detection circuits 102 and combined in summing circuit 17 to threshold 20 to provide a generalized type B threshold of operation control.

Optionally, a similar measure of $Y_L'$ can be included to provide a three dimensional color space contour threshold.

Figure 12B:
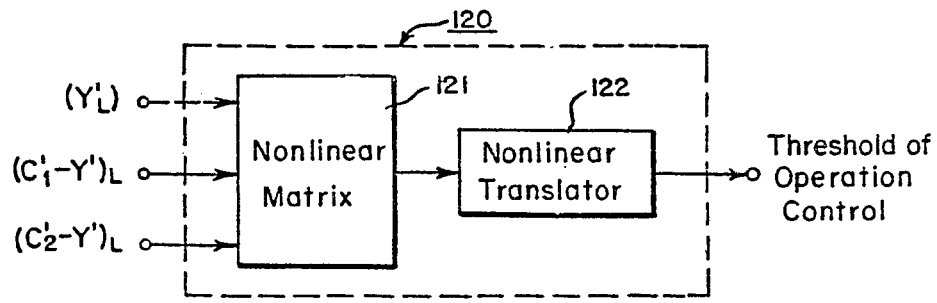

FIG. 12(B) shows use of a nonlinear matrix 121 and nonlinear translator 122 for a similar purpose, but having a wider range of processing contours.

This enabling threshold may be applied alone or concurrently to an element 15 with control means derived from wideband Y' signals as described above in FIGS. 11(A), 11(B) and 11(C).

Conventional combining means may be used to generate a concurrent $E_c$.

(j) Alternative Sequences For Inferred Highs Processing Circuits (FIG. 13)

Figure 13A:
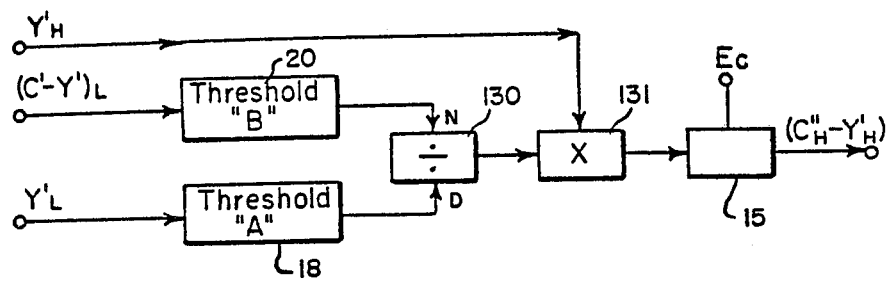
FIGS. 13(A)–(C) are simplified block diagrams of alternative circuits for detecting the existence and/or duration of independent highs, useful for enabling or disabling processing circuits in accordance with the invention.
Figure 13B:
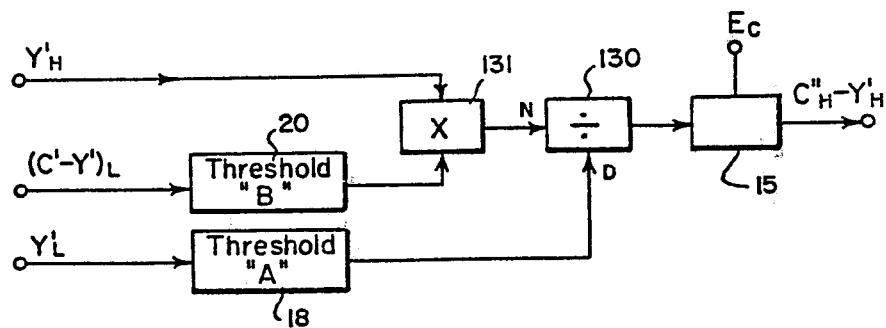

Referring to FIG. 13, it can be seen that inferred highs correction signals in accordance with the invention can be processed in any one of several sequences. In substance, it is sufficient that the inferred highs signal is jointly proportional to the product of (1) the Y' highs, and (2) the chrominance lows and is inversely proportional to the Y' lows. FIG. 13(A) illustrates circuit components for processing inferred chrominance highs by deriving the ratio of the chrominance lows to the Y' lows in a dividing circuit 130 and then multiplying this ratio by the Y' highs in a multiplier circuit 131. FIG. 13(B) shows an alternative arrangement of the circuit components for inferred highs processing wherein the Y' highs are first multiplied by the chrominance lows in a multiplier circuit 131 and the resulting product is divided by the Y' lows in dividing circuit 130.

Figure 13C:
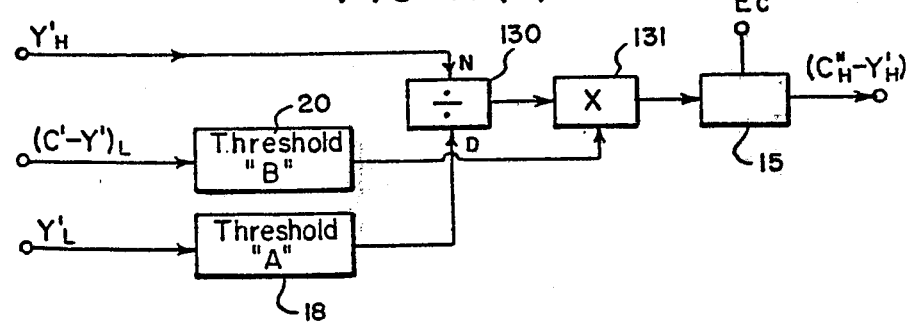

FIG. 13(C) shows yet a further alternative arrangement wherein the Y' highs are divided by the Y' lows in dividing circuit 130 and the resulting ratio is multiplied by the chrominance lows in multiplier 131. In each instance, in FIGS. 13(A)-(C) appropriate thresholding circuitry is provided in the form of type-A or type-B threshold circuits, and control devices 15 are provided for permitting control of the amplitudes of the inferred highs signals thus processed. While the figure illustrates derivation of inferred chrominance highs, the same circuit arrangements can be used to process inferred primary color highs provided the primary color lows are substituted for the chrominance lows at the circuit inputs. In that case the second proportional item above is the color lows.

(k) Receiver With Direct Color Highs Generation With Non-linear Control Of Inferred Highs And Normalization for $Y_H'$ Fidelity (FIG. 14)

FIG. 14 is a simplified block diagram of a further embodiment of the invention wherein control signals for inferred high frequency color components are processed through non-linear circuits. Specifically, primary color lows are processed from the chrominance lows and the monochrome lows in respective summing circuits 17(A). Here, two such signals $C_{1L}$ and $C_{2L}$ are processed from the chrominance signals defining a chrominance axis, and the third primary color low $C_{3L}$ is processed through a matrix circuit 82, matrixing to maintain fidelity to the Y' lows at this point. The Y' lows are provided to the matrix circuit from band splitter 81 which receives monochrome signal Y' from the receiver and provides $Y_H'$ and $Y_L'$ for this circuit.

The respective primary color signals are then applied to the input terminals of respective monotonic translator circuits 140 for providing respective output signals which are monotonic non-linear translations of the primary color signals. Examples of such translators include power law translators for generating Mth power law expansions of the input signals, either in a single power expansion or in a power series with different values for M. The respective translator output signals are then applied to the inputs of respective inverse gain control circuits 141. In addition, the translator outputs are applied to summing circuit 142 which provides an output signal equal to the sum of the respective translator outputs multiplied by the respective relative luminance coefficients for the respective primary colors. This summing circuit output is applied to the control terminal of each of inverse gain control circuits 141 as a normalizing signal in accordance with the teaching of Equations (9) and (10) of this specification. It thereby maintains fidelity of the demixed color highs to $Y_H'$; that is $\Sigma A_c C_H'' = Y_H'$.

When the translator circuits 140 are linear translators, the preferred central algorithm is obtained and the inferred highs are precisely corrected for the radial lines in the chrominance plane as described with regard to FIG. 2. When the translators are non-linear, the lines are curved and regions of greatest correction are moved in the chrominance plane.

Because the Y' lows are equal to the summation of the respective primary color lows multiplied by their respective relative luminace coefficients, the respective outputs of inverse gain controls 141 are ratios representative of the ratio of the values of the respective primary color lows to the Y' lows for the linear case; and, accordingly, the inverse gain control outputs can be used to scale inferred highs from the monochrome highs in accordance with the invention.

For the nonlinear case, the relative size of the demixed signals in the individual colors is changed, but the aggregate still maintains fidelity to $Y_H'$, and the inverse gain control circuits comprise circuit means to provide this result.

Such scaling is effected by applying Y' highs from band splitter 81 to the input terminals of respective modulators 16, and applying the inverse gain control outputs to the control terminals of respective modulators. The modulator outputs are the respective inferred high frequency primary color signals which can be conveniently combined with the primary color lows in respective summing circuits 17(B).

Elements 140 may include, but are clearly not restricted to, thresholds of type B as previously described.

An optional type-A threshold comprising element 18 may be included to constrain the control signals from elements 141 to modulators 16 so as to restrict their maximum amplitudes. Thus the numerator signal N to 141 may be zero, but the denominator signal D may not be zero.

Optionally, control element 15 may be included for enabling and disabling. An optional switch 143 is then included to switch $Y_H'$ either to the multiplicative modulators 16 in the enabled condition, or directly to summing circuits 17(B) in the disabled condition.

For the linear case, fidelity to $Y_L'$ is maintained as previously described because of the suppression of overmodulation by $Y_H'$ and consequent rectification thereof. For nonlinear processing there is a substantial range of complex or concave shapes for $M_c(x)$ for the fidelity to $Y_H'$ is maintained precisely, and for which the fidelity to $Y_L'$ may be substantially enhanced over conventional receivers because each $C_H'$ tends toward zero as the corresponding $C_L'$ tends toward zero.

Since the direct color lows are directly supplied from elements 17(A) and 82 to the summing circuits 17(B) the large area colors are not affected by the non-linear processing of elements 140.

This receiver therefore provides circuit means and methods to provide signals equal to or generally representative of the central inferred highs for intensity modulated colors, and circuit means and methods to maintain fidelity to the Y' lows.

It uses composite non-linear translation means to produce net inferred high frequency color signals generally comparable to that generated in accordance with the central algorithm as defined for intensity modulated colors, and to effectively add comparable inferred independent chrominance highs to the normal video signals for the purposes stated.

In alternative form of the non-linear receiver of FIG. 13 the elements 140 may have increasing rate of increase with increasing input, such as by M > 1 in Equation (9), in which case the net highs are more heavily concentrated in the stronger colors, or conversely may have decreasing rate of increase with increasing input as for example by $1 < M < 0$ in Equation (9) with more concentration of highs in the weaker colors.

Similarly, input signals to $M_c(x)$ could alternatively be derived from circuits providing $$\frac{C_L'}{Y_L'} \text{ or } \frac{C_L'}{(Y_H')_{MAX}}$$

where $(Y_H')_{MAX}$ represents a measured or estimated nonlinear measure of the one-sided peak of amplitude of $Y_H'$ as smoothed with an effective bandwidth which may be roughly comparable to that of $Y_L'$.

Figure 15:
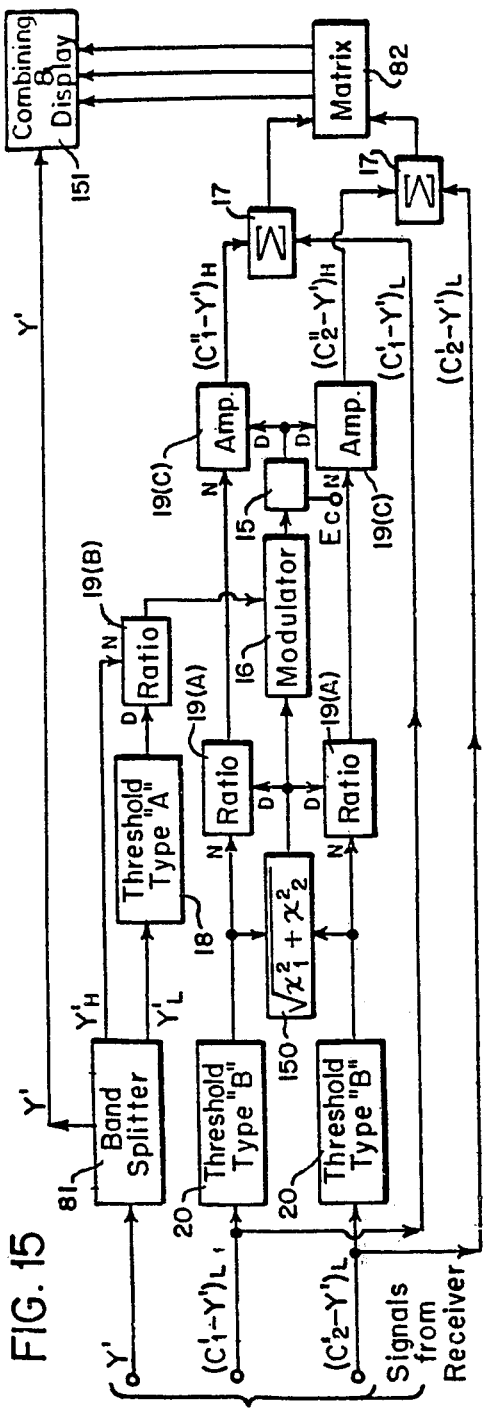
FIG. 15 illustrates an alternative adaptive axis processor in accordance with the invention.

(l) Receiver With Inferred Independent Highs Correction Circuitry On An Adaptive Time-Varying Axis (FIG. 15)

FIG. 15 illustrates a further embodiment of the invention which may be termed an adaptive axis processor. In this embodiment, a pair of quadrature chrominance signals from a receiver (not shown) are applied through respective type-B thresholding circuits 20 to the input terminals of root-sum-squares circuit means 150 for processing an output signal equal to the square root of the sum of the squares of the input chrominance signals and representing the magnitude of the combined chrominance. Each chrominance signal is also applied to the numerator input terminals of respective bipolar ratio circuits 19(A) and the output signal of circuit 150 is applied to the denominator input of each respective ratio circuit 19(A). The outputs of the respective ratio circuits are respective chrominance signals normalized with respect to the signals on the axis and retaining original polarity. They are, in effect, direction cosines.

A monochrome signal Y' derived from the receiver is applied to band splitter 81 wherein it is split into a low frequency portion $Y_L'$ comparable in passband to the chrominance signals and a complementary high frequency portion $Y_H'$. The Y' highs are applied to the numerator input terminal of a ratio circuit 19(B) and the Y' lows, through A-type threshold 18, are applied to the denominator input terminal of circuit 19(B). The resultant thresholded ratio of the Y' highs to the Y' lows comprises a waveform wholly derived from the Y' channel to be scaled or projected back in color space by a signal representative of the chrominance lows to produce inferred independent chrominance highs. For this purpose the output of 19(B) is applied to modulator 16 along with the output of circuit 150 to provide an output signal equal to the ratio of Y' highs to Y' lows multiplied by the amplitude of the local chrominance. The output of 16 is, in turn, controlled in gain in a pair of bipolar gain control circuits 19(C) by signals supplied to the numerator inputs from respective ratio circuits 19(A), thereby producing respective inferred high frequency chrominance components on each of the quadrature color axes in accordance with the invention.

The inferred high frequency chrominance outputs are shown combined with the corresponding chrominance lows in summing circuits 17, matrixed to three colors in matrix 82, and combined additively with a signal representative of Y' in combining and display circuits 151.

In this form of receiver, a signal representative of the amplitude of the instantaneous chrominance at an adaptively varying axis or chrominance phase angle was multiplied by a signal representative of the instantaneous ratio of Y' highs to Y' lows for effectively applying to each of the axes modulation by the ratio of Y' highs to Y' lows.

Figure 16:
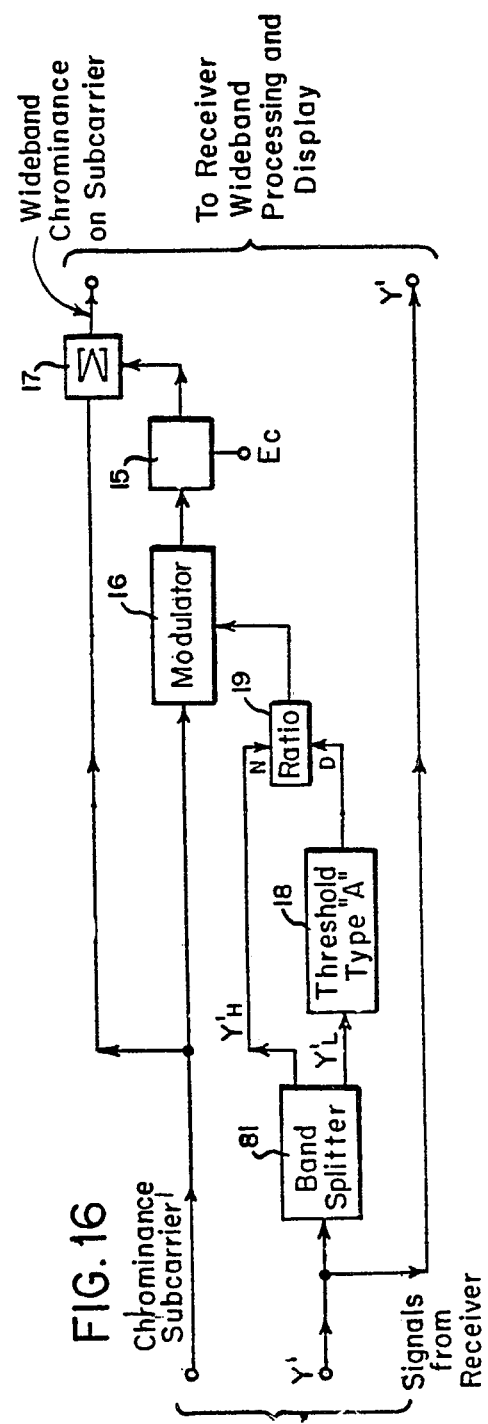
FIG. 16 illustrates an alternative chrominance subcarrier processor in accordance with the invention.

(m) Receiver With Inferred Independent Highs Correction on The Subcarrier (FIG. 16)

FIG. 16 illustrates a further embodiment of the invention which can be utilized for processing inferred high frequency chrominance components for supplementing the chrominance signal while it is still on a subcarrier. In the arrangement shown, the monochrome signal Y' from a receiver (not shown) is applied to band splitter 81 wherein it is split into low and complementary high frequency portions, and the ratio of the Y' highs to the Y' lows is processed by applying the Y' highs to the numerator input of 19 and the Y' lows through the type-A threshold 18 to the denominator input of ratio circuit 19.

The chrominance subcarrier signal is applied from the receiver to one input terminal of a modulator 16 and the ratio of the Y' highs to the Y' lows is applied to the other input terminal. The output of modulator 16 is the instantaneous product of the Y' derived ratio and the instantaneous chrominance lows amplitude, and appears at the phase of the carrier input to element 16.

The output signal from element 16 is provided through control element 15 to summing circuit 17. The output from element 17 comprises a signal on a subcarrier which may be the nominal color subcarrier or one optionally displaced therefrom for processing convenience by a known frequency offset carrier also available for subsequent demodulation processes. Specifically in the case of independent highs the inferred chrominance subcarrier supplied from element 16 has wideband amplitude characteristics in accordance with the basic algorithms of this invention while retaining the phase modulation rates of the received chrominance signals. The output of the modulator 16 is an inferred high frequency chrominance subcarrier supplement which can be conveniently added to chrominance signal on subcarrier at summing circuit 17.

(n) Receiver For Applying Boundary Constraints To Composite Color Signals (FIG. 17)

Figure 17B:
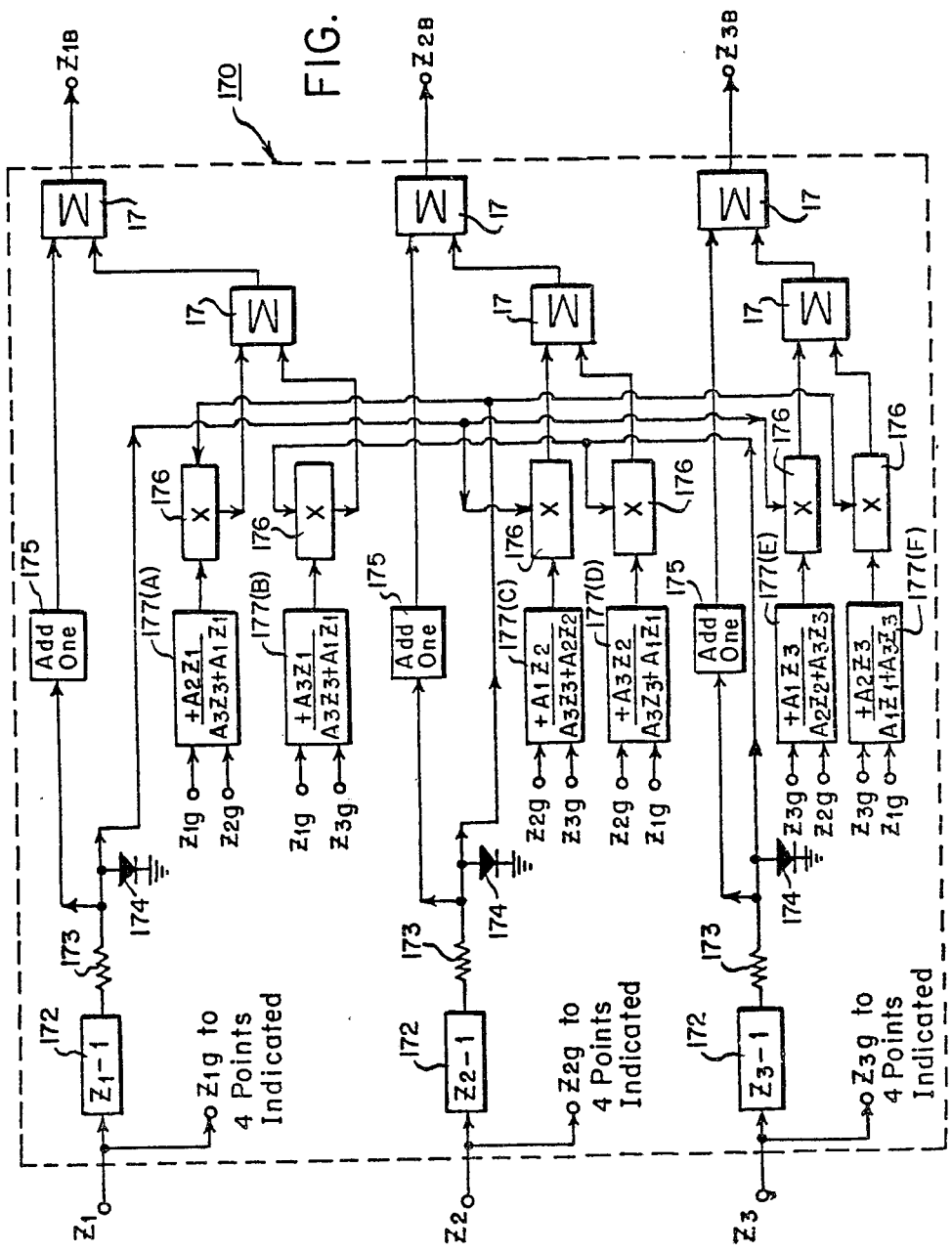

FIGS. 17(A) and 17(B) illustrate correction circuitry in accordance with another embodiment of the invention wherein specific circuit means are provided for processing inferred high frequency components in accordance with specified boundary constraints in order to prevent over-modulation, rectification and desaturation. A receiver (not shown) provides the monochrome video signal Y' and two or more reduced bandwidth chrominance signals $(C_1'-Y')_L$ and $(C_2'-Y')_L$. The Y' signal is split at band splitter 81 into a low frequency component $Y_L'$ comparable to the chrominance signals and a complementary high frequency component $Y_H'$.

If two chrominance lows are provided, they are preferably matrixed in a matrix circuit 82 to provide the third chrominance low, and each of the chrominance lows are combined with the Y' lows in respective summing circuits 17(A) to provide respective primary color lows.

The signal representative of the Y' highs signal is applied to a peak highs estimating circuit 100 of the type described in connection with FIG. 10, above. This is divided into the comparably delayed color lows signals $C_{1L}'$, $C_{2L}'$ and $C_{3L}'$ in ratio circuits 19 which here do not need to encompass all four quadrants, as the deteriorated peak highs are nominally always positive. The outputs of these ratio circuits, which can be designated $Z_1$, $Z_2$, and $Z_3$, provide measures of the size or value of respective primary color lows to a comparable low frequency measure of the envelope amplitude of the Y' highs detected and averaged over a short time interval. These ratio circuit output signals are processed in cross-coupling matrix 170 in order to apportion the infrared highs among the primary color signals in a manner sufficient to avoid over-modulation in any primary color. Element 170 includes some time delay which is compensated by delay circuits 171 in any parallel signal paths.

The delay compensated primary color lows shown are also applied to suitable circuitry 17(B) for summing with the inferred highs and for display (not shown).

FIG. 17(B) illustrates an exemplary cross-coupling matrix circuit 170 useful in the embodiment of FIG. 17(A). This circuit comprises means for determining whether the lows are sufficiently large to support the highs and means for reallocating the highs in those instances where the lows are insufficient.

The determination circuitry can comprise simple respective unity subtraction circuits 172 responsive to $Z_1$, $Z_2$, $Z_3$ for providing an output signal equal to the difference between each Z signal and a unity reference signal. Positive outputs signify that the lows are greater than the highs and that there is little tendency to over-modulate. Negative outputs signify that the lows are likely inadequate to support the highs and, therefore, allocation is desirable to avoid overmodulation. The entire receiver can optionally be configured to reverse all polarities.

Allocation can be effected as follows. The outputs of subtraction circuits 172 are applied through decoupling elements 173 to voltage range inhibiting means 174 here shown as solid-state diodes for the illustrated signal polarity in which signals $Z_1$, $Z_2$ and $Z_3$ are positive of zero as well as in proportion to amplitude of chrominance lows. Thus the signal across elements 174 can go less positive than reference zero or ground but not more positive. Then these signals are supplied to respective "Add One" circuits 175 which give unity outputs for positive input signals corresponding to $Z>1$ and outputs of Z for $Z<1$. The outputs of these "Add One" circuits are, in turn, applied to summing circuits 17.

When any $Z-1=0$ there is no need to divert highs to another color and hence in this circuit the cross coupling control signals from the corresponding element 174 to the multiplier 176 of the other colors is zero, and hence it disables those components by multiplying by zero.

In substance, the redistribution circuitry can be any circuit means for reallocating the inferred highs in a manner which (1) is consistent with maintaining fidelity to the received monochrome signal and (2) does not produce over-modulation in any other primary. One algorithm for such redistribution processing can be derived by requiring (1) that the net change in the effective value of $Y_H'$ be zero or hence that $\Sigma A_C(C_H''-Y_H')=0$, and (2) that the net inferred primary color highs be in proportion to the corresponding lows for any pair of colors which take excess highs from a color for which the lows are inadequate.

Now considering that the lows are inadequate in color one for illustrative purposes, condition (1) implies the following equation:

$$-A_1(Z_1-1)+A_2(Z_1-1)P_2+A_3(Z_1-1)P_3=0$$

where $A_1$, $A_2$ and $A_3$ are the respective luminance coefficientes and $P_2$ and $P_3$ represent the fractions of $(Z_1-1)$ redistributed to $C_2$ and $C_3$, respectively. Condition (2) implies:

$$\frac{C_{H3}''}{C_{H2}''} = \frac{C_{L3}'}{C_{L2}'} = \frac{C_{L3}' + (Z_1-1)P_3}{C_{L2}' + (Z_1-1)P_2}$$

From these equations, $P_2$ and $P_3$ can be derived for redistributing $(Z_1-1)$ as follows when $(Z_1-1)\neq 0$:

$$P_2 = \frac{+A_1Z_2}{A_3Z_3 + A_2Z_2}, \text{ and}$$

$$P_3 = \frac{+A_1Z_3}{A_3Z_3 + A_2Z_2}.$$

FIG. 17(B) includes redistribution circuitry comprising conventional circuit means for calculating the proportions $P_2$ and $P_3$ in circuits 177(A) through 177(F), for multiplying the thus-processed proportions by the amounts to be redistributed in respective multipliers 176, and for summing the allocated portions for each primary in respective summing circuits 17. The resulting composite signals from 17 of FIG. 17(A) are applied to respective modulators 16 of FIG. 17(A) to multiply the Y' highs and thereby derive inferred high frequency color signals.

The resulting inferred highs are scaled from the monochrome highs. Although they are not always directly proportional to the chrominance lows, they are directly proportional when there is not a tendency to overmodulate in any color, and after correction they are monotonic translations of the respective chrominance lows in that the highs inferred for the respective channels increase in magnitude with the chrominance lows for the respective colors. The control signal to any multiplication modulator is $(C_H''/Y_H') = Z_{1B}$.

If a color designated 1 has $(Z_1-1)<0$ at some time then the colors 2 and 3 have additional components added in the output summing network 17 to provide the correct net chrominance highs. A similar result ensues when two colors are too small.

When only a single primary color has non-zero lows, say $C_3$, then from the above equations, letting $(Z_1-1)=-1$ and $(Z_2-1)=-1$ then $Z_{3B}=1+A_1/A_3+A_2/A_3=1/A_3$. Thus the highs in the single primary color are returned to the proper amplitude in accordance with the teaching of FIG. 1.

The control signals $Z_{1B}$, $Z_{2B}$ and $Z_{3B}$ are therefore all unity when every color low is larger than the peak magnitude of $Y_H'$, but proportionately less than unity in those colors which are too small, with the excess transferred to the remaining colors to maintain fidelity to $Y_H'$.

While the invention has been described in connection with only a small number of specific embodiments, it is to be understood that these are merely illustrative of many other specific embodiments which can also utilize the principles of the invention. For example, while the preferred embodiments herein have been described using standard signal technology of the NTSC system used in the United States, it should be understood that the inventive concepts are equally applicable to NTSC derived systems such as the well-known PAL and SECAM systems. And while the operating concepts of the invention have been primarily explained in the environment of a conventional home television receiver, it should be appreciated that the same signal processing methods and circuits can also be advantageously used to enhance the quality of image reproduction at any stage of signal transmission or reception where the bandwidths of the chrominance signals have been restricted compared to the bandwidth of the monochrome video signal but do not need to be so restricted thereafter. Accordingly, the expression "color television receiving system" as used herein is meant to generally define and embrace color television systems or subsystems which process NTSC-type color television signals at some stage prior to image display. Examples of such systems in which the present invention may be advantageously employed include video recording and recording playback apparatus, large screen theater displays, cable television systems and off-the-air receivers such as home television receivers. Signal processing circuits such as video detectors, chrominance subcarrier synchronous detectors and video signal matrixing circuits currently used in such receiving systems are well known in the art and may be utilized to supply the wideband monochrome and restricted bandwidth chrominance input signals for processing in accordance with the concepts of the invention. Thus, numerous and varied devices can be made by those skilled in the art without departing from the spirit and scope of the present invention.

I claim:

1. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

receiving circuit means responsive to said composite color television signal for processing therefrom a wide bandwidth monochrome signal and one or more reduced bandwidth chrominance signals;

correction circuit means responsive to said wide bandwidth monochrome signal and to said one or more reduced bandwidth chrominance signals for effectively processing one or more respective inferred independent high frequency chrominance components which are proportional in amplitude to the product of: a first signal representative of a high frequency portion of said monochrome signal; a second signal representative of said respective reduced bandwidth chrominance signals, and the inverse of a third signal representative of the value of a low frequency portion of said wide bandwidth monochrome signal, the bandwidth of said low frequency monochrome portion being substantially comparable to that of a respective chrominance signal and the bandwidth of the high frequency portion of said monochrome signal being substantially complementary to that of the low frequency portion of the monochrome signal; and circuit means for effectively separately combining said respective inferred independent high frequency chrominance components with the signals to be displayed.

2. A receiving system according to claim 1, wherein:

said receiving circuit means comprises circuit means responsive to said received signals for processing therefrom one or more reduced bandwidth primary color signals;

said correction circuit comprises means for processing for each said primary color signal, an inferred high frequency color component which is substantially proportional to the product of (1) a signal representative of said high frequency portion of said monochrome signal; and (2) a signal representative of said reduced bandwidth primary color signal; and (3) the inverse of a signal representative of a low frequency portion of said monochrome signal; and said combining circuit means comprises circuit means for effectively combining said inferred high frequency color components with said reduced bandwidth primary color signals, to be displayed.

3. A receiving system according to claim 1, wherein:

said receiving circuit comprises circuit means responsive to said received signals for processing therefrom one or more reduced bandwidth primary color signals corresponding to respective reduced bandwidth chrominance signals;

said correction circuit comprises (1) circuit means responsive to said respective reduced bandwidth chrominance signals and to one or more low frequency components of said monochrome signal for processing for each said reduced bandwidth chrominance signal a ratio signal representative of the ratio of said chrominance signal to said low frequency monochrome component, (2) circuit means for effectively adding to each said ratio signal a reference signal of substantially unity value to produce a composite control signal, and (3) circuit means jointly responsive to said composite control signals and to said monochrome signal for processing for each said primary color signal an inferred high frequency component substantially proportional to the product of said respective composite control signal and a high frequency portion of said monochrome signal; and said combining circuit comprises circuit means for effectively combining said inferred high frequency components with said reduced bandwidth primary color signals to be displayed.

4. A receiving system according to claim 1, wherein each of said inferred high frequency chrominance components is monotonically proportional in amplitude to the product of said first, second and third signals.

5. A receiving system according to claim 1, wherein the inferred independent high frequency components substantially restore the amplitude of high frequency signal components in image areas having intensity modulated colors.

6. A receiving system according to claim 1, wherein the inferred high frequency components cause the net color highs for any primary to approach zero value when the color lows for that primary approach zero value.

7. A receiving system according to claim 1, which further includes a mode decision circuit responsive to components in the received signals for producing an output control signal from which the existence or nonexistence of independent highs are inferred; and control circuit means operatively responsive to said control signal for effectively enabling or disabling said correction circuit.

8. A receiving system according to claim 7, characterized in that the mode decision circuit is responsive to components derived from the wideband monochrome signal.

9. A receiving system according to claim 1, wherein said correction circuit further includes means for permitting effective selection of the amplitude of one or more of said inferred high frequency components.

10. A receiving system according to claim 1, wherein said correction circuit includes means for maintaining substantial fidelity of the monochrome components of pictures displayed from the corrected signals with respect to the received monochrome signal.

11. A receiving system according to claim 1, wherein said correction circuit includes means for maintaining substantial fidelity of the monochrome components of pictures displayed from the corrected signals with respect to the received monochrome mixed highs.

12. A receiving system according to claim 1, wherein said correction circuit means includes means for maintaining substantial fidelity of the monochrome components of pictures displayed from the corrected signals with respect to the low frequency portion of the received monochrome signal.

13. A receiving system according to claim 1, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

14. A receiving system according to claim 1, wherein said correction circuit further includes threshold means for preventing the generation of excessively large inferred correction signals when the magnitude of said low frequency portion of the monochrome signal falls below a selected value.

15. A receiving system according to claim 1, wherein the correction circuit further includes threshold means for preventing the generation of inferred correction signals when the magnitude of a reduced bandwidth chrominance signals falls below a selected value.

16. A color television system for receiving a composite color television signal comprising a wide bandwidth monochrome video signal and a plurality of reduced bandwidth chrominance signals, wherein the absence of high frequency chrominance components may produce inadequate highs in significantly colored areas, overmodulation, undesired rectification and desaturation in colored areas having mixed highs of relatively substantial amplitude, said system comprising:

receiving circuit means responsive to said composite color television signal for processing therefrom a wide bandwidth monochrome signal and one or more reduced bandwidth chrominance signals;

correction circuit means responsive to said wide bandwidth monochrome signal and to said one or more reduced bandwidth chrominance signals for effectively processing one or more respective inferred independent high frequency color components which are proportional to the product of a first signal representative of a high frequency portion of said monochrome signal, a second signal monotonically representative of at least the color lows, and the inverse of a third, or normalizing signal which is monotonically representative of a low frequency portion of said wide bandwidth monochrome signal; and combining circuit means for effectively separately combining said respective inferred high frequency color components with the signals to be displayed.

17. A receiving system according to claim 16, wherein said correction circuit effectively processes one or more respective inferred independent high frequency color components which are proportional in amplitude to the product of a first signal representative of a high frequency portion of said monochrome signal, a second signal representative of said respective reduced bandwidth color signal and the inverse of a third signal representative of a low frequency portion of said monochrome signal having a bandwidth comparable to said color signal.

18. A receiving system according to claim 16, wherein the bandwidth of the low frequency portion of the monochrome signal is substantially comparable to that of a respective chrominance signal and the bandwidth of the high frequency portion of said monochrome signal is substantially complementary to that of the low frequency portion of the monochrome signal.

19. A receiving system according to claim 16, wherein said second signal is a respective primary color signal which is processed by a non-linear translator and said third signal includes a summation of three primary color signals.

20. A receiving system according to claim 19, wherein said non-linear translators have a power law transfer characteristic.

21. A receiving system according to claim 19, wherein said non-linear translators have a monotonic transfer characteristic.

22. A receiving system according to claim 16, wherein:
said receiving circuit means comprises circuit means responsive to said received signals for processing therefrom one or more reduced bandwidth primary color signals;
said correction circuit comprises means for processing for each said primary color signal, an inferred high frequency color component which is substantially proportional to the product of (1) a signal representative of said high frequency portion of said monochrome signal; and (2) a signal representative of said reduced bandwidth primary color signal; and (3) the inverse of a signal representative of a low frequency portion of said monochrome signal; and
said combining circuit means comprises circuit means for effectively combining said inferred high frequency color components with said reduced bandwidth primary color signals to be displayed.

23. A receiving system according to claim 16, wherein:
said receiving circuit comprises circuit means responsive to said received signals for processing therefrom one or more reduced bandwidth primary color signals corresponding to respective reduced bandwidth chrominance signals;
said correction circuit comprises (1) circuit means responsive to said respective reduced bandwidth chrominance signals and to one or more low frequency components of said monochrome signal for processing for each said reduced bandwidth chrominance signal a ratio signal representative of the ratio of said chrominance signal to said low frequency monochrome component, (2) circuit means for effectively adding to each said ratio signal a reference signal of substantially unity value to produce a composite control signal, and (3) circuit means jointly responsive to said composite control signals and to said monochrome signal for processing for each said primary color signal an inferred high frequency component substantially proportional to the product of said respective composite control signal and a high frequency portion of said monochrome signal; and
said combining circuit comprises circuit means for effectively combining said inferred high frequency components with said reduced bandwidth primary color signals to be displayed.

24. A receiving system according to claim 16, wherein the inferred independent high frequency components substantially restore the amplitude of high frequency signal components in image areas having intensity modulated colors.

25. A receiving system according to claim 16, wherein the inferred high frequency components cause the net color highs for any primary to approach zero value when the color lows for that primary approach zero value.

26. A receiving system according to claim 16, which further includes a mode decision circuit responsive to components in the received signals for producing an output control signal from which the existence or non-existence of independent highs are inferred; and control circuit means operatively responsive to said control signal for effectively enabling or disabling said correction circuit.

27. A receiving system according to claim 26, characterized in that the mode decision circuit is responsive to components derived from the wideband monochrome signal.

28. A receiving system according to claim 16, wherein said correction circuit further includes means for permitting effective selection of the amplitude of one or more of said inferred high frequency components.

29. A receiving system according to claim 16, wherein said correction circuit includes means for maintaining substantial fidelity of the monochrome components of pictures displayed from the corrected signals with respect to the received monochrome signal.

30. A receiving system according to claim 16, wherein said correction circuit includes means for maintaining substantial fidelity of the monochrome components of pictures displayed from the corrected signals with respect to the received monochrome mixed highs.

31. A receiving system according to claim 16, wherein said correction circuit means includes means for maintaining substantial fidelity of the monochrome components of pictures displayed from the corrected signals with respect to the low frequency portion of the received monochrome signal.

32. A receiving system according to claim 16, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

33. A receiving system according to claim 16, wherein said correction circuit further includes threshold means for preventing the generation of excessively large inferred correction signals when the magnitude of said low frequency portion of the monochrome signal falls below a selected value.

34. A receiving system according to claim 16, wherein the correction circuit further includes threshold means for preventing the generation of inferred correction signals when the magnitude of a reduced bandwidth chrominance signal falls below a selected value.

35. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:
receiving circuit means responsive to said composite color television signal for processing therefrom a wide bandwidth monochrome signal and one or more reduced bandwidth chrominance signals;
correction circuit means responsive to said wide bandwidth monochrome signal and to said one or more reduced bandwidth chrominance signals for effectively processing one or more respective inferred independent high frequency color components which are proportional in amplitude to the product of a first signal representative of a high frequency portion of said monochrome signal and a second signal monotonically representative of at least the color lows derived from said composite signal, the amplitude of said product signal tending towards zero value when said color lows go to zero; and proportioning circuit means effectively responsive to said first and second signals for relatively proportioning the amplitude of the respective inferred high frequency color components to maintain substantial fidelity of the monochrome components of pictures displayed from corrected signals with respect to the received monochrome mixed highs; and circuit means for separately combining said respective inferred high frequency color components with the signals to be displayed to effectively provide corrected signals having effective inferred high frequency chrominance components.

36. A receiving system according to claim 35, wherein said correction circuit effectively processes one or more respective inferred independent high frequency color components which are proportional in amplitude to the product of a first signal representative of a high frequency portion of said monochrome signal, a second signal representative of said respective reduced bandwidth color signal, the product of said first and second signals being proportioned in amplitude by the inverse of a third signal representative of the value of a low frequency portion of said monochrome signal.

37. A receiving system according to claim 35, wherein said second signal is a respective primary color signal which is processed by a non-linear translator, the product of said first and second signals being proportioned in amplitude by the inverse of a third signal representative of a summation of three primary color signals which is processed by a non-linear translator.

38. A receiving system according to claim 37, wherein said non-linear translators have a power law transfer characteristic.

39. A receiving system according to claim 37, wherein said non-linear translators have a monotonic transfer characteristic.

40. A receiving system according to claim 35, wherein said correction circuit includes separate circuit means for each of said color signals for producing an output ratio signal representative of a monotonic measure of color lows with respect to monochrome mixed highs; decision circuit means separately responsive to each of said ratio signals for producing a redistribution control signal when one or more of said primary color signals is inadequate to support the allocated portion of monochrome mixed highs without overmodulation; and said proportioning circuit includes a redistribution circuit means responsive to one or more of said control signals for relatively redistributing the monochrome mixed highs among said primary color signals to substantially eliminate overmodulation and restore the amplitude of high frequency signal components in image areas having intensity modulated colors.

41. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

receiving circuit means responsive to said composite color television signal for processing therefrom a wide bandwidth monochrome signal and one or more reduced bandwidth chrominance signals;

correction circuit means responsive to said wide bandwidth monochrome signal and to said one or more reduced bandwidth chrominance signals for effectively processing one or more respective inferred independent high frequency chrominance components which are proportional in amplitude to the product of: a first signal representative of a high frequency portion of said wide bandwidth monochrome signal; a second signal representative of said respective reduced bandwidth chrominance signals, and the inverse of a third signal representative of the value of a low frequency portion of said wide bandwidth monochrome signal; and circuit means for separatley combining said respective inferred independent high frequency chrominance components with the signals to be displayed.

42. A receiving system according to claim 41, wherein:

said receiving circuit means comprises circuit means responsive to said received signals for processing therefrom one or more reduced bandwidth primary color signals;

said correction circuit comprises means for processing for each said primary color signal, an inferred high frequency color component which is substantially proportional to the product of a first signal representative of said high frequency portion of said monochrome signal; a second signal representative of said reduced bandwidth primary color signal; and the inverse of a third signal representative of a low frequency portion of said monochrome signal; and said combining circuit means comprises circuit means for effectively combining said inferred high frequency color components with said reduced bandwidth primary color signals to be displayed.

43. A receiving system according to claim 41, wherein:

said receiving circuit comprises circuit means responsive to said received signals for processing therefrom one or more reduced bandwidth primary color signals corresponding to respective reduced bandwidth chrominance signals;

said correction circuit comprises (1) circuit means responsive to said respective reduced bandwidth chrominance signals and to one or more low frequency components of said monochrome signal for processing for each said reduced bandwidth chrominance signal a ratio signal representative of the ratio of said chrominance signal to said low frequency monochrome component, (2) circuit means for effectively adding to each said ratio signal a reference signal of substantially unity value to produce a composite control signal, and (3) circuit means jointly responsive to said composite control signals and to said monochrome signal for processing for each said primary color signal an inferred high frequency component substantially proportional to the product of said respective composite control signal and a high frequency portion of said monochrome signal; and said combining circuit comprises circuit means for effectively combining said inferred high frequency components with said reduced bandwidth primary color signals to be displayed.

44. A receiving system according to claim 41, wherein each of said inferred high frequency chrominance components is monotonically proportional in amplitude to the product of said first, second and third signals.

45. A receiving system according to claim 41, wherein the inferred independent high frequency components substantially restore the amplitude of high frequency signal components in image areas having intensity modulated colors.

46. A receiving system according to claim 41, wherein the inferred high frequency components cause the net color highs for any primary to approach zero value when the color lows for that primary approach zero value.

47. A receiving system according to claim 41, which further includes a mode decision circuit responsive to components in the received signals for producing an output control signal from which the existence or non-existence of independent highs are inferred; and control circuit means operatively responsive to said control signal for effectively enabling or disabling said correction circuit.

48. A receiving system according to claim 47, characterized in that the mode decision circuit is responsive to components derived from the wideband monochrome signal.

49. A receiving system according to claim 41, wherein said correction circuit further includes means for permitting effective selection of the amplitude of one or more of said inferred high frequency components.

50. A receiving system according to claim 41, wherein said correction circuit includes means for maintaining substantial fidelity of the monochrome components of pictures displayed from the corrected signals with respect to the received monochrome signals.

51. A receiving system according to claim 41, wherein said correction circuit includes means for maintaining substantial fidelity of the monochrome components of pictures displayed from the corrected signals with respect to the received monochrome mixed highs.

52. A receiving system according to claim 41, wherein said correction circuit means includes means for maintaining substantial fidelity of the monochrome components of pictures displayed from the corrected signals with respect to the low frequency portion of the received monochrome signal.

53. A receiving system according to claim 41, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

54. A receiving system according to claim 41, wherein said correction circuit further includes threshold means for preventing the generation of excessively large inferred correction signals when the magnitude of said low frequency portion of the monochrome signal falls below a selected value.

55. A receiving system according to claim 41, wherein the correction circuit further includes threshold means for preventing the generation of inferred correction signals when the magnitude of a reduced bandwidth chrominance signal falls below a selected value.

56. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

receiving circuit means responsive to said composite color television signal for processing therefrom a wide bandwidth monochrome signal and a plurality of reduced bandwidth chrominance signals;

circuit means responsive to said composite signal for processing therefrom a plurality of reduced bandwidth primary color signals;

inferred independent highs correction circuit means comprising circuit means for processing for one or more of said primary color signals, respective inferred high frequency color components which are substantially proportional in amplitude to the product of a first signal representative of the high frequency portion of said wide bandwidth monochrome signal exceeding the bandwidth of said reduced bandwidth primary color signal, a second signal representative of said reduced bandwidth primary color signal, and the inverse of a third signal representative of the low frequency portion of said monochrome signal having a bandwidth comparable to that of said reduced bandwidth color signal; and combining circuit means for effectively combining said inferred independent high frequency color components with said reduced bandwidth primary color signals to effectively add missing high frequency chrominance components to the signals to be displayed.

57. A receiving system according to claim 56, wherein each of said inferred high frequency color components is monotonically proportional in amplitude to the product of said first, second and third signals.

58. A receiving system according to claim 56, wherein the inferred independent high frequency components substantially restore the amplitude of high frequency signal components in image areas having intensity modulated colors.

59. A receiving system according to claim 56, wherein the inferred high frequency components cause the net color highs for any primary to approach zero value when the color lows for that primary approach zero value.

60. A receiving system according to claim 56, which further includes a mode decision circuit responsive to components in the received signals for producing an output control signal from which the existence or nonexistence of independent highs are inferred; and control circuit means operatively responsive to said control signal for effectively enabling or disabling said correction circuit.

61. A receiving system according to claim 60, characterized in that the mode decision circuit is responsive to components derived from the wideband monochrome signal.

62. A receiving system according to claim 56, wherein said correction circuit further includes means for permitting effective selection of the amplitude of one or more of said inferred high frequency components.

63. A receiving system according to claim 56, wherein said correction circuit includes means for maintaining substantial fidelity of the monochrome components of pictures displayed from the corrected signals with respect to the received monochrome signal.

64. A receiving system according to claim 56, wherein said correction circuit includes means for maintaining substantial fidelity of the monochrome components of pictures displayed from the corrected signals with respect to the received monochrome mixed highs.

65. A receiving system according to claim 56, wherein said correction circuit means for maintaining substantial fidelity of the monochrome components of pictures displayed from the corrected signals with respect to the low frequency portion of the received monochrome signal.

66. A receiving system according to claim 56, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

67. A receiving system according to claim 56, wherein said correction circuit further includes threshold means for preventing the generation of excessively large inferred correction signals when the magnitude of said low frequency portion of the monochrome signal falls below a selected value.

68. A receiving system according to claim 56, wherein the correction circuit further includes threshold means for preventing the generation of inferred correction signals when the magnitude of a reduced bandwidth chrominance signal falls below a selected value.

69. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:
receiving circuit means responsive to a said composite color television signal for processing therefrom a wide bandwidth monochrome signal and one or more reduced bandwidth primary color signals corresponding to respective reduced bandwidth chrominance signals;
inferred independent highs correction circuit means comprising (1) circuit means responsive to said wide bandwidth monochrome signal and one or more of said reduced bandwidth primary color signals for processing for each said primary color signal, a ratio signal representative of the ratio of said primary color signal to a comparable bandwidth low frequency portion of said monochrome signal, and (2) circuit means responsive to said wide bandwidth monochrome signal and said ratio signals for processing for each of said one or more primary color signals an inferred independent high frequency color component substantially proportional in amplitude to the product of said ratio signal and a signal representative of the high frequency portion of said monochrome signal exceeding the bandwidth of said primary color signal; and combining circuit means for effectively combining said inferred independent high frequency color components with said reduced bandwidth primary color signals to effectively add missing high frequency chrominance components to the signals to be displayed.

70. A receiving system according to claim 69, wherein:
said correction circuit further comprising circuit means responsive to said respective reduced bandwidth chrominance signals and to one or more low frequency components of said monochrome signal for processing for each said reduced bandwidth chrominance signal a ratio signal representative of the ratio of said chrominance signal to said low frequency monochrome component, circuit means for effectively adding to each said ratio signal a reference signal of substantially unity value to produce a composite control signal, and circuit means jointly responsive to said composite control signals and to said monochrome signal for processing for each said primary color signal an inferred high frequency component substantially proportional to the product of said respective composite control signal and a high frequency portion of said monochrome signal; and
said combining circuit comprises circuit means for effectively combining said inferred high frequency components with said reduced bandwidth primary color signals to be displayed.

71. A receiving system according to claim 69, wherein each of said inferred high frequency chrominance components is monotonically proportional in amplitude to the product of said first, second and third signals.

72. A receiving system according to claim 69, wherein the inferred independent high frequency components substantially restore the amplitude of high frequency signal components in image areas having intensity modulated colors.

73. A receiving system according to claim 69, wherein the inferred independent high frequency components approach zero value when the color lows in a respective chrominance signal approach zero value.

74. A receiving system according to claim 69, which further includes a mode decision circuit responsive to components in the received signals for producing an output control signal from which the existence or nonexistence of independent highs are inferred; and control circuit means operatively responsive to said control signal for effectively enabling or disabling said correction circuit.

75. A receiving system according to claim 74, characterized in that the mode decision circuit is responsive to components derived from the wideband monochrome signal.

76. A receiving system according to claim 69, wherein said correction circuit further includes means for permitting effective selection of the amplitude of one or more of said inferred high frequency components.

77. A receiving system according to claim 69, wherein said correction circuit includes means for maintaining substantial fidelity of the monochrome components of pictures displayed from the corrected signals with respect to the received monochrome signal.

78. A receiving system according to claim 69, wherein said correction circuit includes means for maintaining substantial fidelity of the monochrome components of pictures displayed from the corrected signals with respect to the received monochrome mixed highs.

79. A receiving system according to claim 69, wherein said correction circuit means includes means for maintaining substantial fidelity of the monochrome components of pictures displayed from the corrected signals with respect to the low frequency portion of the received monochrome signal.

80. A receiving system according to claim 69, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

81. A receiving system according to claim 69, wherein said correction circuit further includes threshold means for preventing the generation of excessively large inferred correction signals when the magnitude of said low frequency portion of the monochrome signal falls below a selected value.

82. A receiving system according to claim 69, wherein the correction circuit further includes threshold means for preventing the generation of inferred correction signals when the magnitude of a reduced bandwidth chrominance signal falls below a selected value.

83. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

signal processing means responsive to said wideband monochrome signal to produce an output control signal representative of the instantaneous ratio of the monochrome mixed highs relative to the monochrome mixed lows;

signal translation means responsive to said reduced bandwidth chrominance signals and said control signals for generating a first inferred chrominance highs correction signal proportional to the product of (1) said control signal, (2) a signal representative of the instantaneous magnitude of said reduced bandwidth chrominance signals and (3) a signal representative of the sine of the instantaneous chrominance phase angle; and a second chrominance highs correction signal proportional to the product of (1) said output control signal, (2) a signal representative of the instantaneous magnitude of said reduced bandwidth chrominance signals and (3) a signal representative of the cosine of the instantaneous chrominance phase angle.

84. A receiving system according to claim 83, wherein the inferred independent high frequency components substantially restore the amplitude of high frequency signal components in image areas having intensity modulated colors.

85. A receiving system according to claim 83, wherein the inferred independent high frequency components approach zero value when the color lows in a respective chrominance signal approach zero value.

86. A receiving system according to claim 83, which further includes a mode decision circuit responsive to components in the received signals for producing an output control signal from which the existence or non-existence of independent highs are inferred; and control circuit means operatively responsive to said control signal for effectively enabling or disabling said correction circuit.

87. A receiving system according to claim 86, characterized in that the mode decision circuit produces a control signal in response to a comparison of high frequency and low frequency components derived from the wideband monochrome signal.

88. A receiving system according to claim 83, wherein said correction circuit further includes means for permitting effective selection of the amplitude of one or more of said inferred high frequency components.

89. A receiving system according to claim 83, wherein said correction circuit includes means for maintaining substantial fidelity of the monochrome components of pictures displayed from the corrected signals with respect to the received monochrome signal.

90. A receiving system according to claim 83, wherein said correction circuit includes means for maintaining substantial fidelity of the monochrome components of pictures displayed from the corrected signals with respect to the received monochrome mixed highs.

91. A receiving system according to claim 83, wherein said correction circuit means includes means for maintaining substantial fidelity of the monochrome components of pictures displayed from the corrected signals with respect to the low frequency portion of the received monochrome signal.

92. A receiving system according to claim 83, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

93. A receiving system according to claim 83, wherein said correction circuit further includes threshold means for preventing the generation of excessively large inferred correction signals when the magnitude of said low frequency portion of the monochrome signal falls below a selected value.

94. A receiving signal according to claim 83, wherein the correction circuit further includes threshold means for preventing the generation of inferred correction signals when the magnitude of a reduced bandwidth chrominance signal falls below a selected value.

95. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

receiving circuit means responsive to a composite color television signal for processing therefrom a wide bandwidth monochrome signal and a chrominance subcarrier signal quadrature modulated with a pair of reduced bandwidth chrominance signals; inferred independent highs correction circuit means for effectively supplementing said modulated chrominance subcarrier signal with a corrective subcarrier signal modulated with inferred high frequency chrominance components, said corrective subcarrier signal being substantially proportional in value to the product of a first signal representative of the high frequency portion of said monochrome signal, a second signal representative of the instantaneous amplitude of the quadrature modulated chrominance subcarrier signal, and the inverse of a third signal representative of the low frequency portion of said monochrome signal; the bandwidth of said low frequency monochrome portion being substantially comparable to that of a respective chrominance signal and the bandwidth of the high frequency portion of said monochrome signal being substantially complementary to that of a low frequency portion of said monochrome signal; and means for combining said corrective subcarrier signal with the received quadrature modulated subcarrier signal.

96. A receiving system according to claim 95, wherein each of said inferred high frequency chrominance components is monotonically proportional in amplitude to the product of said first, second and third signals.

97. A receiving system according to claim 95, wherein the inferred independent high frequency components substantially restore the amplitude of high frequency signal components in image areas having intensity modulated colors.

98. A receiving system according to claim 95, wherein the inferred independent high frequency components approach zero value when the color lows in a respective chrominance signal approach zero value.

99. A receiving system according to claim 95, which further includes a mode decision circuit responsive to components in the received signals for producing an output control signal from which the existence or non-existence of independent highs are inferred; and control circuit means operatively responsive to said control signal for effectively enabling or disabling said correction circuit.

100. A receiving system according to claim 95, characterized in that the mode decision circuit is responsive to components derived from the wideband monochrome signal.

101. A receiving system according to claim 95, wherein said correction circuit further includes means for permitting effective selection of the amplitude of one or more of said inferred high frequency components.

102. A receiving system according to claim 95, wherein said correction circuit includes means for maintaining substantial fidelity of the monochrome components of pictures displayed from the corrected signals with respect to the received monochrome signal.

103. A receiving system according to claim 95, wherein said correction circuit includes means for maintaining substantial fidelity of the monochrome components of pictures displayed from the corrected signals with respect to the received monochrome mixed highs.

104. A receiving system according to claim 95, wherein said correction circuit means includes means for maintaining substantial fidelity of the monochrome components of pictures displayed from the corrected signals with respect to the low frequency portion of the received monochrome signal.

105. A receiving system according to claim 95, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

106. A receiving system according to claim 95, wherein said correction circuit further includes threshold means for preventing the generation of excessively large inferred correction signals when the magnitude of said low frequency portion of the monochrome signal falls below a selected value.

107. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

means responsive to said plural reduced bandwidth chrominance signals to produce a chrominance magnitude signal representative of a monotonic measure of the instantaneous magnitude of chrominance;

means responsive to said wide bandwidth monochrome signal to produce a differential control signal proportional in value to the ratio of a signal representative of selected high frequency monochrome components of said wide bandwidth monochrome signal with respect to a signal representative of selected low frequency monochrome components of said wide bandwidth monochrome signal;

modulator means jointly responsive to said chrominance magnitude signal and differential control signal to produce a product output signal proportional to the product of said chrominance magnitude signal and said differential control signal;

circuit means separately responsive to each said reduced bandwidth chrominance signal and to said chrominance magnitude signal to produce a chrominance phase output signal representative of the instantaneous phase of each said reduced bandwidth chrominance signal; and correction circuit means for each reduced bandwidth chrominance signal for generating an inferred highs signal proportional to the product of said product signal and a respective chrominance phase signal.

108. A receiving system according to claim 107, wherein the inferred independent high frequency components substantially restore the amplitude of high frequency signal components in image areas having intensity modulated colors.

109. A receiving system according to claim 107, wherein the inferred independent high frequency components approach zero value when the color lows in a respective chrominance signal approach zero value.

110. A receiving system according to claim 107, which further includes a mode decision circuit responsive to components in the received signals for producing an output control signal from which the existence or non-existence of independent highs are inferred; and control circuit means operatively responsive to said control signal for effectively enabling or disabling said correction circuit.

111. A receiving system according to claim 107, characterized in that the mode decision circuit is responsive to components derived from the wideband monochrome signal.

112. A receiving system according to claim 107, wherein said correction circuit further includes means for permitting effective selection of the amplitude of one or more of said inferred high frequency components.

113. A receiving system according to claim 107, wherein said correction circuit includes means for maintaining substantial fidelity of the monochrome components of pictures displayed from the corrected signals with respect to the received monochrome signal.

114. A receiving system according to claim 107, wherein said correction circuit includes means for maintaining substantial fidelity of the monochrome components of pictures displayed from the corrected signals with respect to the received monochrome mixed highs.

115. A receiving system according to claim 107, wherein said correction circuit means includes means for maintaining substantial fidelity of the monochrome components of pictures displayed from the corrected signals with respect to the low frequency portion of the received monochrome signal.

116. A receiving system according to claim 107, wherein said correction circuit further includes threshold means for preventing the generation of excessively large inferred correction signals when the magnitude of said low frequency portion of the monochrome signal falls below a selected value.

117. A receiving system according to claim 107, wherein the correction circuit further includes threshold means for preventing the generation of inferred correction signals when the magnitude of a reduced bandwidth chrominance signal falls below a selected value.

118. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:
  signal processing means responsive to said wideband monochrome signal for generating a monochrome ratio signal proportional to the ratio of selected high frequency components to selected low frequency components;
  signal processing means for generating separate signals representative of low frequency components in each of the plural reduced bandwidth chrominance signals;
  means responsive to said plural reduced bandwidth chrominance signals for producing an output chrominance magnitude signal;
  circuit means for generating a normalized chrominance signal for each of said chrominance signals which is proportional to the ratio of a respective reduced bandwidth chrominance signal and said chrominance magnitude signal;
  circuit means for generating an inferred highs control signal proportional in amplitude to the product of said chrominance magnitude signal and said monochrome ratio signal; and
  signal translation means for each of said plural chrominance signals for producing a corrective high frequency chrominance signal proportional in amplitude to the product of said inferred highs control signal and a respective normalized chrominance signal.

119. A receiving system according to claim 118, wherein the inferred independent high frequency components substantially restore the amplitude of high frequency signal components in image areas having intensity modulated colors.

120. A receiving system according to claim 118, wherein the inferred independent high frequency components approach zero value when the color lows in a respective chrominance signal approach zero value.

121. A receiving system according to claim 118, which further includes a mode decision circuit responsive to components in the received signals for producing an output control signal from which the existence or non-existence of independent highs are inferred; and control circuits means operatively responsive to said control signal for effectively enabling or disabling said correction circuit.

122. A receiving system according to claim 118, characterized in that the mode decision circuit in responsive to components derived from the wideband monochrome signal.

123. A receiving system according to claim 118, wherein said correction circuit further includes means for permitting effective selection of the amplitude of one or more of said inferred high frequency components.

124. A receiving system according to claim 118, wherein said correction circuit includes means for maintaining substantial fidelity of the monochrome components of pictures displayed from the corrected signals with respect to the received monochrome signal.

125. A receiving system according to claim 118, wherein said correction circuit includes means for maintaining substantial fidelity of the monochrome components of pictures displayed from the corrected signals with respect to the received monochrome mixed highs.

126. A receiving system according to claim 118, wherein said correction circuit means includes means for maintaining substantial fidelity of the monochrome components of pictures displayed from the corrected signals with respect to the low frequency portion of the received monochrome signal.

127. A receiving system according to claim 118, wherein said correction circuit further includes threshold means for preventing the generation of excessively large inferred correction signals when the magnitude of said low frequency portion of the monochrome signal falls below a selected value.

128. A receiving system according to claim 118, wherein the correction circuit further includes threshold means for preventing the generation of inferred correction signals when the magnitude of a reduced bandwidth chrominance signal falls below a selected value.

129. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

receiving circuit means responsive to said composite color television signal for processing therefrom a wide bandwidth monochrome signal and a plurality of reduced bandwidth chrominance signals;

mode controllable inferred independent highs correction circuit means responsive to said wide bandwidth monochrome signal and said reduced bandwidth chrominance signals for processing and effectively separately combining with said received reduced bandwidth chrominance signals, inferred demixed highs for reducing the visibility of said display errors;

mode decision circuit means responsive to a selected measure of components in the received signals for producing an output control signal indicating either the existence or non-existence of inferred independent highs;

mode control circuit means responsive to said mode decision control signal for effectively enabling or disabling said mode controllable inferred independent highs correction circuit.

130. A color television system as in claim 129, wherein said mode decision circuit includes means for effecting comparison and normalization of a signal derived from the monochrome highs and a signal derived from the rate-of-change of the monochrome lows for producing one or more signal signatures representative thereof; evaluation means responsive to said signal signatures to apply preselected amplitude criteria and produce a mode control signal in recognition of said signal signatures either as being compatible or incompatible with the inferred existence of independent highs.

131. A receiving system according to claim 129, wherein:

said controllable inferred highs correction circuit is normally off except when enabled;

said mode decision circuit comprises circuit means responsive to components in the received signals for detecting signal characteristics compatible with the existence of inferred independent highs; and said mode control circuit comprises circuit means responsive to said mode decision circuit for enabling said controllable inferred highs correction circuit during signal intervals in which signal characteristics compatible with the existence of independent highs are detected.

132. A receiving system according to claim 129, wherein:

said controllable inferred highs correction circuit is normally on except when disabled;

said mode decision circuit includes circuit means responsive to components in the received signal for detecting a signal relationship incompatible with the existence of independent highs; and said mode control circuit comprises means for disabling said controllable inferred highs correction circuit during periods of a signal relationship incompatible with the existence of independent highs.

133. A receiving system according to claim 129, wherein said mode decision circuit includes:

circuit means responsive to components of said monochrome signal for processing a comparison signal derived from the comparison of a signal representative of a high frequency portion of the monochrome signal with a dynamic signal derived from the low frequency portion of said monochrome signal; and evaluation circuit means for determining whether or not said comparison signal has a signal signature compatible or incompatible with the inferred existence of independent highs.

134. A receiving system according to claim 133, which further includes means for constraining the respective high and low frequency portions of said monochrome signal which are compared to substantially non-overlapping frequency bands.

135. A receiving system according to claim 133, which further includes means for constraining the respective high and low frequency portions of said monochrome signal which are compared to partially overlapping frequency bands.

136. A receiving system according to claim 133, wherein said comparison signal is the ratio of the monochrome highs to the first order time derivative of the monochrome lows.

137. A receiving system according to claim 133, wherein said comparison signal is the ratio of the first order time derivative of the monochrome highs to the first order time derivative of the monochrome lows.

138. A receiving system according to claim 133, wherein said evaluation circuit includes an amplitude window which produces an output mode control signal when the amplitude of the comparison signal equals or exceeds the threshold of said amplitude window and filter means are provided for rejecting narrow output pulses from the amplitude window having a time duration less than a predetermined minimum.

139. A receiving system according to claim 133, wherein said comparison signal is generated by comparing an integrated rectified measure of the monochrome highs with an integrated rectified measure of the time rate-of-change of the monochrome lows and an amplitude window responsive to said comparison signal is provided to produce an enabling control signal when the comparison signal exceeds a predetermined threshold level.

140. A receiving system according to claim 133, wherein said system includes means responsive to the monochrome signal to produce a normalized comparison signal $\rho_{11}$ proportional in amplitude to the ratio of a signal representative of the rate-of-change of monochrome high frequency components with respect to a signal representative of the rate-of-change of monochrome low frequency components, circuit means for comparing the amplitude of said $\rho_{11}$ signal with an amplitude window to produce a decision control signal for enabling said independent highs correction circuit.

141. A receiving system according to claim 129, wherein the decision circuit includes means for squaring and summing a signal representative of each chrominance signal and a signal representative of the low frequency portion of said monochrome signal to produce a color space contour control signal; and amplitude threshold means responsive to said contour control signal to produce a mode control signal for effectively enabling or disabling said mode controllable correction circuit.

142. A receiving system according to claim 129, wherein the decision circuit includes a non-linear matrix for combining signals representative of the monochrome lows and the respective chrominance signals to produce a color space contour control signal; and non-linear translator means responsive to said contour signal to produce a mode control signal for effectively enabling or disabling said mode controllable correction circuit.

143. A receiving system according to claim 133, wherein said mode decision circuit includes means responsive to the wideband monochrome signal to produce a normalized comparison signal proportional in amplitude to the ratio of a signal representative of an integrated monopolar measure of monochrome highs with respect to a signal representative of an integrated monopolar measure of the time rate-of-change of monochrome lows; and a signature evaluation circuit including an amplitude window responsive to said comparison signal to produce a mode decision control signal.

144. A receiving system according to claim 133, wherein said mode decision circuit includes means responsive to the wideband monochrome signal to produce a first normalized comparison signal $\rho_{11}$ proportional in amplitude to the ratio of a signal representative of the rate-of-change of monochrome high frequency components with respect to a signal representative of the rate-of-change of monochrome low frequency components; second circuit means responsive to the wideband monochrome signal to produce a second normalized comparison signal $\rho_1$ proportional in amplitude to the ratio of a signal representative of monochrome high frequency components with respect to a signal representative of the rate-of-change of monochrome low frequency components; first evaluation circuit means including an amplitude window responsive to the $\rho_{11}$ comparison signal to produce a first correction circuit enabling signal $\beta_{I11}$; second evaluation circuit means including an amplitude window responsive to the $\rho_1$ comparison signal to produce a confirming correction circuit enabling signal $\beta_{I1}$; and circuit means including an AND gate responsive to enabling control signals $\beta_{I11}$ and $\beta_{I1}$ to produce a confirmed mode decision control signal $(\beta_{I11})(\beta_{I1})$.

145. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

circuit means responsive to said composite color television signal for processing therefrom a wide bandwidth monochrome signal including a mixed highs portion and a plurality of reduced bandwidth chrominance signals having respective associated primary color signals; and inferred independent highs correction circuit means for effectively supplementing one or more of said reduced bandwidth chrominance signals with respective inferred high frequency correction components for reducing the visibility of one or more color infidelities, comprising circuit means for processing and effectively separately combining with each of said one or more received chrominance signals, respective inferred de-mixed highs which are scaled from the monochrome mixed highs to produce inferred color highs relatively controlled in amplitude and constrained to approach zero values as the respective associated primary color signals approach zero.

146. A receiving system according to claim 145, wherein the inferred independent high frequency components substantially restore the amplitude of high frequency signal components in image areas having intensity modulated colors.

147. A receiving system according to claim 145, which further includes a mode decision circuit responsive to components in the received signals for producing an output control signal from which the existence or non-existence of independent highs are inferred; and control circuit means operatively responsive to said control signal for effectively enabling or disabling said correction circuit.

148. A receiving system according to claim 145, wherein said correction circuit further includes means for permitting effective selection of the amplitude of one or more of said inferred high frequency components.

149. A receiving system according to claim 145, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

150. A color television system for receiving a composite color television signal comprising a wide bandwidth monochrome video signal and a plurality of reduced bandwidth chrominance signals, wherein the absence of high frequency chrominance components may produce inadequate highs in sufficiently colored areas, and overmodulations, undesired rectification and desaturation in colored areas having mixed highs of relatively substantial amplitude, said system comprising:

circuit means responsive to said composite color television signal for processing therefrom a wide bandwidth monochrome signal including a mixed highs portion and a plurality of reduced bandwidth chrominance signals having respective associated primary color signals; and inferred independent highs correction circuit means for effectively supplementing one or more of said reduced bandwidth chrominance signals with respective inferred high frequency correction components for reducing the visibility of one or more color infidelities, comprising circuit means for processing and effectively separately combining with each of said one or more received chrominance signals, respective inferred de-mixed highs which are scaled from the monochrome mixed highs and, in the limit of only one non-zero associated primary color, produce inferred color highs scaled from the monochrome mixed highs with a scaling factor proportional to the reciprocal of the relative luminance coefficient for the non-zero primary color.

151. A receiving system according to claim 150, wherein the inferred independent high frequency components substantially restore the amplitude of high frequency signal components in image areas having intensity modulated colors.

152. A receiving system according to claim 150, which further includes mode decision circuit responsive to components in the received signals for producing an output control signal from which the existence or non-existence of independent highs are inferred; and control circuit means operatively responsive to said control signal for effectively enabling or disabling said correction circuit.

153. A receiving system according to claim 150, wherein said correction circuit further includes means for permitting effective selection of the amplitude of one or more of said inferred high frequency components.

154. A receiving system according to claim 150, wherein said correction circuit includes means for maintaining substantial fidelity of the monochrome components of pictures displayed from the corrected signals with respect to the received monochrome signal.

155. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:
receiving circuit means responsive to said composite color television signal for processing therefrom a wide bandwidth monochrome signal including mixed highs, and a plurality of reduced bandwidth chrominance signals having respective primary color signals; and
inferred independent highs correction circuit means for effectively supplementing one or more of said reduced bandwidth chrominance signals with respective inferred high frequency correction components for reducing the visibility of one or more of color infidelities, comprising circuit means for processing and effectively separately combining with each of said one or more received chrominance signals, respective inferred de-mixed highs which are scaled from the monochrome mixed highs and, in the limit or two primary color signals of comparable amplitudes with the third primary signal effectively absent, produce inferred color highs constrained to approach zero amplitude in the absent primary and scaled from the monochrome mixed highs for each of the two comparable amplitude primaries with a scaling factor proportional to the reciprocal of the summed relative luminance coefficients for two comparable amplitude primaries.

156. A receiving system according to claim 155, wherein the inferred independent high frequency components substantially restore the amplitude of high frequency signal components in image areas having intensity modulated colors.

157. A receiving system according to claim 155, which further includes a mode decision circuit responsive to components in the received signals for producing an output control signal from which the existence or non-existence of independent highs are inferred; and control circuit means operatively responsive to said control signal for effectively enabling or disabling said correction circuit.

158. A receiving system according to claim 155, wherein said correction circuit further includes means for permitting effective selection of the amplitude of one or more of said inferred high frequency components.

159. A receiving system according to claim 155, wherein said correction circuit includes means for maintaining substantial fidelity of the monochrome components of pictures displayed from the corrected signals with respect to the received monochrome signal.

160. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:
circuit means responsive to said composite color television signal for processing therefrom a wide bandwidth monochrome signal including a mixed highs portion and a plurality of reduced bandwidth chrominance signals having respective associated primary color signals; and
inferred independent highs correction circuit means for effectively supplementing one or more of said reduced bandwidth chrominance signals with respective inferred high frequency correction components for reducing the visibility of one or more of color infidelities, comprising circuit means for processing and effectively separately combining with each of said one or more chrominance signals, respective inferred de-mixed highs which are scaled from the monochrome mixed highs and constrained to maintain fidelity to the monochrome signal for intensity modulated colors.

161. A receiving system according to claim 160, wherein the inferred independent high frequency components substantially restore the amplitude of high frequency signal components in image areas having intensity modulated colors.

162. A receiving system according to claim 160, which further includes a mode decision circuit responsive to components in the received signals for producing an output control signal from which the existence or non-existence of independent highs are inferred; and control circuit means operatively responsive to said control signal for effectively enabling or disabling said correction circuit.

163. A receiving system according to claim 160, wherein said correction circuit further includes means for permitting effective selection of the amplitude of one or more of said inferred high frequency components.

164. A receiving system according to claim 160, wherein said correction circuit includes means for maintaining substantial fidelity of the monochrome components of pictures displayed from the corrected signals with respect to the received monochrome signal.

165. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

circuit means responsive to said composite color television signal for processing therefrom a wide bandwidth monochrome signal including a mixed highs portion and a plurality of reduced bandwidth chrominance signals having respective associated reduced bandwidth primary color signals;

separate circuit means for each of said reduced bandwidth primary color signals for producing an output ratio signal representative of a monotonic measure of color lows with respect to monochrome mixed highs;

decision circuit means separately responsive to each of said ratio signals for producing a redistribution control signal when one or more of said primary color signals is inadequate in amplitude to support the allocated portion of monochrome mixed highs without overmodulation; and redistribution circuit means responsive to said redistribution control signals for relatively redistributing the monochrome mixed highs among said primary color signals to substantially eliminate overmodulation while substantially maintaining fidelity to the high frequency portion of the received monochrome signal.

166. A receiving system according to claim 165, wherein the inferred independent high frequency components substantially restore the amplitude of high frequency signal components in image areas having intensity modulated colors.

167. A receiving system according to claim 165, which further includes a mode decision circuit responsive to components in the received signals for producing an output control signal from which the existence or non-existence of independent highs are inferred; and control circuit means operatively responsive to said control signal for effectively enabling or disabling said correction circuit.

168. A receiving system according to claim 165, wherein said correction circuit further includes means for permitting effective selection of the amplitude of one or more of said inferred high frequency components.

169. Inferred independent highs correction circuit means for processing correction components for a composite color television signal comprising a wide bandwidth monochrome video signal and a plurality of reduced bandwidth chrominance signals including associated primary color signals, wherein the absence of high frequency chrominance components, particularly in highly colored regions, can produce visible color and luminance display errors, said circuit means comprising:

circuit means for processing for each of one or more reduced bandwidth chrominance signals, respective inferred high frequency chrominance components which are (1) substantially proportional to the product of a first signal representative of the high frequency portion of said monochrome signal exceeding the bandwidth of a reduced bandwidth chrominance signal, a second signal representative of said reduced bandwidth chrominance signal and the reciprocal of a third signal representative of the value of the low frequency portion of said monochrome signal having a bandwidth comparable to that of said reduced bandwidth chrominance signal.

170. A correction circuit according to claim 169, comprising circuit means for processing for each said reduced bandwidth chrominance signal a ratio signal proportional in amplitude to the ratio of a respective chrominance signal with respect to said corresponding low frequency monochrome component; and circuit means responsive to said respective ratio signals and to said respective high frequency monochrome components for processing for each said chrominance signal on inferred high frequency chrominance component substantially proportional in amplitude to the product of said ratio signal and said respective high frequency monochrome component.

171. A correction circuit according to claim 169, comprising:

circuit means responsive to said wide bandwidth monochrome signal for processing therefrom one or more monochrome ratio signals proportional in amplitude to the ratio of a high frequency portion of said monochrome signal with respect to a low frequency portion of said monochrome signal; and circuit means responsive to said respective monochrome ratio signals and to said one or more respective reduced bandwidth chrominance signals for processing for each said respective chrominance signal an inferred high frequency component substantially proportional to the product of said monochrome ratio signal and the value of said reduced bandwidth chrominance signal.

172. A correction circuit according to claim 169, comprising:

circuit means for processing for one or more of said primary color signals, respective inferred high frequency color components which are substantially proportional in amplitude to the product of a first signal representative of a high frequency portion of said monochrome signal, a second signal representative of the value of said reduced bandwidth primary color signal and the reciprocal of a third signal representative of the vaue of a low frequency portion of said monochrome signal.

173. A correction circuit according to claim 169, comprising:

circuit means responsive to said one or more reduced bandwidth primary color signals and to respective low frequency monochrome components for processing for each said reduced bandwidth primary color signal, a ratio signal proportional in amplitude to the ratio of said primary color signal with respect to said respective low frequency monochrome component, and circuit means responsive to said respective ratio signals and to respective high frequency monochrome components for processing for each said primary color signal an inferred high frequency color component substantially proportional to the product of said ratio signal and said respective high frequency monochrome component.

174. A correction circuit according to claim 169, comprising:

circuit means responsive to said wide bandwidth monochrome signal for processing therefrom one or more monochrome ratio signals proportional in amplitude to the ratio of a high frequency portion of said monochrome signal with respect to a low frequency portion of said monochrome signal; and circuit means responsive to said monochrome ratio signals and to said reduced bandwidth primary color signals for processing for each said primary color signal an inferred high frequency color component substantially proportional to the product of a said monochrome ratio signal and the value of said reduced bandwidth primary color signal.

175. A correction circuit according to claim 169, comprising:

circuit means responsive to said respective reduced bandwidth chrominance signals and to one or more low frequency components of said monochrome signal for processing for each said reduced bandwidth chrominance signal a ratio signal proportional in amplitude to the ratio of said chrominance signal with respect to said low frequency monochrome component; and circuit means responsive to a ratio signal and to said monochrome signal for processing for each said primary color signal an inferred high frequency component substantially proportional to the product of said respective composite control signal and a high frequency portion of said monochrome signal.

176. A correction circuit according to claim 169, wherein each of said inferred high frequency chrominance components is monotonically proportional in amplitude to the product of said first, second and third signals.

177. A correction circuit according to claim 169, wherein the inferred independent high frequency components substantially restore the amplitude of high frequency signal components in image areas having intensity modulated colors.

178. A correction circuit according to claim 169, wherein the inferred independent high frequency components approach zero value when the color lows in a respective chrominance signal approach zero value.

179. A correction circuit according to claim 169, which further includes a mode decision circuit responsive to components in the received signals for producing an output control signal from which the existence or non-existence of independent highs are inferred; and control circuit means operatively responsive to said control signal for effectively enabling or disabling said correction circuit.

180. A correction circuit according to claim 179, characterized in that the mode decision circuit is responsive to components derived from the wideband monochrome signal.

181. A correction circuit according to claim 169, wherein said correction circuit further includes means for permitting effective selection of the amplitude of one or more of said inferred high frequency components.

182. A correction circuit according to claim 169, wherein said correction circuit includes means for maintaining substantial fidelity of the monochrome components of pictures displayed from the corrected signal with respect to the received monochrome signal.

183. A correction circuit according to claim 169, wherein said correction circuit includes means for maintaining substantial fidelity of the monochrome components of pictures displayed from the correction signals with respect to the received monochrome mixed highs.

184. A correction circuit according to claim 169, wherein said correction circuit means includes means for maintaining substantial fidelity of the monochrome components of pictures displayed from the corrected signals with respect to the low frequency portion of the received monochrome signal.

185. A correction circuit according to claim 169, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

186. A correction circuit according to claim 169, wherein said correction circuit further includes threshold means for preventing the generation of inferred correction signals when the magnitude of said low frequency portion of the monochrome signal falls below a selected value.

187. A correction circuit according to claim 169, wherein the correction circuit further includes threshold means for preventing the generation of inferred correction signals when the magnitude of a reduced bandwidth chrominance signal falls below a selected value.

188. A correction circuit according to claim 169, wherein said correction circuit includes a bandsplitter for separating the wideband monochrome signal into low and high frequency portions having substantially complementary bandwidths.

189. A correction circuit according to claim 169, wherein said composite color television signal is an NTSC type signal having first and second chrominance signals of unequal bandwidths and said correction circuit includes bandsplitter means for processing the wideband monochrome signal to produce first and second band pairs, said first band pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

190. A method for reducing color and luminance errors in the display of a color television signal comprising a wide bandwidth monochrome signal and a plurality of reduced bandwidth chrominance signals including associated reduced bandwidth primary color signals, comprising the steps of:

processing for one or more of said reduced bandwidth chrominance signals respective inferred independent high frequency chrominance components which are substantially proportional to the product of a first signal representative of the value of the high frequency portion of said monochrome signal exceeding the bandwidth of said reduced bandwidth chrominance signal, a second signal representative of the value of said reduced bandwidth chrominance signal and the reciprocal of a third signal representative of the value of the low frequency portion of said monochrome signal having a bandwidth comparable to that of said reduced bandwidth chrominance signal; and effectively separately adding said inferred high frequency chrominance components to said respective reduced bandwidth chrominance signals.

191. A method according to claim 190, comprising the steps of processing for one or more of said associated primary color signals respective inferred high frequency color components which are substantially proportional to the product of a first signal representative of the high frequency portion of said monochrome signal exceeding the bandwidth of said reduced bandwidth primary color signal, a second signal representative of the value of said reduced bandwidth primary color signal and the reciprocal of a third signal representative of the value of the low frequency portion of said monochrome signal having a bandwidth comparable to that of said reduced bandwidth color signal effectively separately adding said inferred high frequency color components to the respective reduced bandwidth color signals to be displayed.

192. A color television system for receiving a composite color television signal comprising a wide bandwidth monochrome video signal and a plurality of reduced bandwidth chrominance signals, wherein the absence of high frequency chrominance components may produce inadequate highs in significantly colored areas, and overmodulation, undesired rectification and desaturation in colored areas having mixed highs of relatively substantial amplitude, said system comprising:

receiving circuit means responsive to said composite color television signal for processing therefrom a wide bandwidth monochrome signal and three primary color signals;

circuit means responsive to said primary color signals for producing separate monotonic non-linear translations of the respective primary color signals;

summing circuit means for producing a normalizing signal representative of the sum of the monotonic non-linear translations of the primary color signals multiplied by the respective relative luminance coefficients of the primary color signals;

separate correction circuit means for generating inferred independent high frequency primary color signals for corrective combination with each of said respective primary color signals, each of said inferred signals being proportional to the product of (1) a signal representative of a high frequency portion of said monochrome signal, (2) said signal representative of a monotonic non-linear translation of a respective color signal and (3) the inverse of said normalizing signal; and circuit means for combining each of said inferred high frequency color signals with the corresponding primary color signal to be displayed.

193. A receiving system according to claim 192, wherein said non-linear translators have a power law transfer characteristic having an exponent greater than one.

194. A receiving system according to claim 192, wherein said non-linear translators have a power law transfer charaacteristic having an exponent less than one.

195. A receiving system according to claim 192, wherein said non-linear translator includes an amplitude limiting threshold.

196. A receiving system according to claim 192, wherein the inferred independent high frequency components substantially restore the amplitude of high frequency signal components in image areas having intensity modulated colors.

197. A receiving system according to claim 192, wherein the inferred independent high frequency color components approach zero value when the color lows in a respective primary signal approach zero value.

198. A receiving system according to claim 192, which further includes a mode decision circuit responsive to components in the received signals for producing an output control signal from which the existence or non-existence of independent highs are inferred; and control circuit means operatively responsive to said control signal for effectively enabling or disabling said correction circuit.

199. A receiving system according to claim 198, characterized in that the mode decision circuit produces a control signal in response to a comparison of high frequency and low frequency components derived from the wideband monochrome signal.

200. A receiving system according to claim 192, wherein said correction circuit further includes means for permitting effective selection of the amplitude of one or more of said inferred high frequency components.

201. A receiving system according to claim 192, wherein said correction circuit includes means for maintaining substantial fidelity of the monochrome components of pictures displayed from the corrected signals with respect to the received monochrome signal.

202. A receiving system according to claim 192, wherein said correction circuit includes means for maintaining substantial fidelity of the monochrome components of pictures displayed from the corrected signals with respect to the received monochrome mixed highs.

203. A receiving system according to claim 192, wherein said correction circuit means includes means for maintaining substantial fidelity of the monochrome components of pictures displayed from the corrected signals with respect to the low frequency portion of the received monochrome signal.

204. A receiving system according to claim 192, which further includes a detector responsive to one or more portions of the composite television signal for producing a control signal representative of the signal-to-noise ratio; and control circuit means responsive to said control signal for effectively reducing the amplitude of said inferred high frequency components in the presence of signal-to-noise ratios below a predetermined value.

205. A receiving system according to claim 192, wherein said correction circuit further includes threshold means for preventing the generation of excessively large inferred correction signals when the magnitude of said normalization signal falls below a selected value.

206. A receiving system according to claim 192, wherein said correction circuit includes a bandsplitter for separating the wideband monochrome signal into substantially complementary low frequency and high frequency portions the low frequency portion being comparable in bandwidth to the primary color signals.

207. A receiving system according to claim 129, wherein said decision circuit includes means for generating a control signal in response to a comparison of at least two quadrature related signal components derived from said monochrome signal.

208. A receiving system according to claim 129, wherein said decision circuit includes means for generating a control signal in response to a concurrent comparison of at least two quadrature related signal components derived from said monochrome signal.

209. A receiving system according to claim 129, wherein said decision circuit includes means for generating a control signal in response to a comparison of a plurality of signal components derived from said composite signal.

210. A method for reducing color and luminance errors in the display of a color television signal comprising a wide bandwidth monochrome signal and a plurality of reduced bandwidth chrominance signals including associated reduced bandwidth primary color signals, said method comprising the steps of:

processing for each color signal to be corrected an inferred independent highs correction signal proportional in amplitude to the product of a first signal representative of a high frequency portion of said monochrome signal exceeding the bandwidth of the chrominance signal to be corrected, and a second signal monotonically representative of at least the color lows;

controlling said correction signal so that its amplitude approaches zero when the corresponding color lows go to zero; and proportioning the amplitudes of respective inferred independent highs correction signals to maintain substantial fidelity of the monochrome components of images displayed from corrected signals with respect to the received monochrome mixed highs.

211. A method according to claim 210, which additionally includes the steps of: effectively measuring for each color signal to be corrected the amplitude ratio of color lows with respect to monochrome mixed highs to determine the adequacy of a primary color signal to support an allocated portion of monochrome mixed highs without display overmodulation; distributing the monochrome mixed highs among the primary color signals to substantially eliminate overmodulation and to restore the amplitude of high frequency signal components in image areas having intensity modulated colors.

212. A receiving system according to claim 165, wherein said system further includes means for maintaining substantial fidelity of the monochrome low frequency components of images displayed from the corrected signals with respect to the received monochrome signal.

* * * * *